US011836184B2

(12) United States Patent
Murali

(10) Patent No.: US 11,836,184 B2
(45) Date of Patent: *Dec. 5, 2023

(54) AUTOMATIC METADATA DETECTOR BASED ON IMAGES

(71) Applicant: Spotify AB, Stockholm (SE)

(72) Inventor: Vidhya Murali, Jersey City, NJ (US)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/576,741

(22) Filed: Jan. 14, 2022

(65) Prior Publication Data
US 2022/0215211 A1 Jul. 7, 2022

Related U.S. Application Data

(63) Continuation of application No. 16/452,319, filed on Jun. 25, 2019, now Pat. No. 11,263,493.

(51) Int. Cl.
*G06F 16/55* (2019.01)
*G06F 16/45* (2019.01)
(Continued)

(52) U.S. Cl.
CPC .......... *G06F 16/55* (2019.01); *G06F 16/4387* (2019.01); *G06F 16/45* (2019.01); *G06F 18/214* (2023.01); *G06F 18/217* (2023.01); *G06F 18/24* (2023.01); *G06N 3/04* (2013.01); *G06N 3/08* (2013.01); *G06V 10/764* (2022.01); *G06V 10/776* (2022.01)

(58) Field of Classification Search
CPC ...... G06F 16/55; G06F 16/4387; G06F 16/45; G06F 18/214; G06F 18/217; G06F 18/24; G06N 3/04; G06N 3/08; G06N 3/045; G06V 10/764; G06V 10/776
USPC ........................................................ 382/157
See application file for complete search history.

(56) References Cited

U.S. PATENT DOCUMENTS 8,200,025 B2 6/2012 Woodbeck
8,452,088 B1 5/2013 De Ponti
(Continued)

OTHER PUBLICATIONS

"Distance and Similarity Coefficients", Available Online at: http://paleo.cortland.edu/class/stats/documents/11_Similarity (last accessed May 4, 2018).
(Continued)

*Primary Examiner* — Juan A Torres
(74) *Attorney, Agent, or Firm* — Merchant & Gould P.C.

(57) ABSTRACT

A system, method and computer program product for accessing content. The method comprises processing at least one image with a classifier, and, in response to the at least one image being processed by the classifier, outputting from the classifier a value indicative of the likelihood that the at least one image belongs to at least one classification. The method also comprises determining whether the at least one image belongs to the at least one classification, based on the value, and accessing predetermined content when it is determined that the at least one image belongs to the at least one classification. Images may be classified by, e.g., genre, musical album, concept, or the like, and, in cases where an image belongs to any such classes, predetermined content (e.g., metadata and/or an audio track) relating thereto is identified and presented to the user.

20 Claims, 14 Drawing Sheets

(51) Int. Cl.
  *G06N 3/08* (2023.01)
  *G06F 16/438* (2019.01)
  *G06N 3/04* (2023.01)
  *G06F 18/24* (2023.01)
  *G06F 18/214* (2023.01)
  *G06F 18/21* (2023.01)
  *G06V 10/764* (2022.01)
  *G06V 10/776* (2022.01)

(56) References Cited

U.S. PATENT DOCUMENTS

| | | |
|---|---|---|
| 9,626,436 B2 | 4/2017 | Roger |
| 9,723,369 B2 | 8/2017 | Kim |
| 9,743,033 B2 | 8/2017 | Kim et al. |
| 9,830,526 B1 | 11/2017 | Lin |
| 10,140,515 B1 | 11/2018 | Waldo |
| 10,872,115 B2 | 12/2020 | Agrawal |
| 11,138,469 B2 * | 10/2021 | Almazan .............. G06V 40/173 |
| 11,182,424 B2 | 11/2021 | Murali |
| 2008/0256100 A1 | 10/2008 | van de Sluis |
| 2010/0070057 A1 | 3/2010 | Sugiyama |
| 2011/0113331 A1 | 5/2011 | Herberger |
| 2011/0225153 A1 | 9/2011 | Haseyama |
| 2012/0098946 A1 | 4/2012 | Seung |
| 2012/0301032 A1 | 11/2012 | Kawanishi |
| 2012/0323914 A1 | 12/2012 | Rothschild |
| 2013/0205243 A1 | 8/2013 | Rivera |
| 2014/0040262 A1 | 2/2014 | Winter |
| 2014/0063317 A1 | 3/2014 | Jung |
| 2015/0120720 A1 | 4/2015 | Dhara |
| 2017/0228616 A1 | 8/2017 | Tasdizen |
| 2018/0025215 A1 | 1/2018 | Yousef et al. |
| 2018/0052908 A1 | 2/2018 | Liu |
| 2019/0163766 A1 | 5/2019 | Gulati |
| 2019/0347357 A1 | 11/2019 | Murali |
| 2020/0097742 A1 * | 3/2020 | Ratnesh Kumar ... G06V 10/764 |
| 2020/0226421 A1 | 7/2020 | Almazan |
| 2020/0410298 A1 | 12/2020 | Murali |
| 2022/0114209 A1 | 4/2022 | Murali |

OTHER PUBLICATIONS

Apple Inc., "Creating an Image Classifier Model," Apple Developer, 2018. Available at: https://developer.apple.com/documentation/createml/creating_an_image_classifier_model.

Bernhardsson, Erik, "Music recommendations using cover images (part 1)". Available Online at: https://erikbern.com/2014/04/01/music-recommendations-using-cover-images--part-1.html (2014).

Bernhardsson, Erik, "Nearest neighbors and vector models—part 2—algorithms and data structures". Available Online at: https://erikbern.com/2015/10/01/nearest-neighbors-and-vector-models-part-- 2-how-to-search-in-high-dimensional-spaces.html (2015).

Brochu et al., "The Sounds of an Album Cover: Probabilistic Multimedia and IR" (2002).

Deal, Allison, "Visual Shazam with Album Covers," Medium, May 8, 2017. Available at: https://medium.com/@_shiftseven/visual-shazam-hack-7a822bf44d80.

Gandhi, Rohith, "R-CNN, Fast R-CNN, Faster R-CNN, YOLO—Object Detection Algorithms", Towards Data Science, Jul. 9, 2018, appearing at https://towardsdatascience.com/r-cnn-fast-r-cnn-faster-r-cnn-yolo-object--detection-algorithms-36d53571365e.

Ghandi, Rohith, "Support Vector Machine—Introduction to Machine Learning Algorithms (SVM Model by Scratch)", Towards Data Science, Jul. 7, 2018, appearing at https://towardsdatascience.com/support-vector-machine-introduction-to-machine-learning-algorithms-934a444fca47.

Girshick, Ross, "Fast R-CNN", The IEEE International Conference on Computer Vision (ICCV), 2015, pp. 1440-1448.

Girshick, Ross, et al., "Rich feature hierarchies for accurate object detection and semantic segmentation", The IEEE Conference on Computer Vision and Pattern Recognition (CVPR), 2014, pp. 580-587.

He et al., "Deep Residual Learning for Image Recognition", 2016 IEEE Conference on Computer Vision and Pattern Recognition (CVPR), pp. 770-778 (Jun. 2016).

Locklear, Mallory, "'Record Player' app. searches Spotify when you snap a pic of an album," Engadget, May 4, 2018. Available at: https://www.engadget.com/2018/05/04/record-player-app-image-based-spotify- -search/.

Maine, Samantha, "This app is like Shazam but for album covers," NME, May 2, 2018. Available at: https://www.nme.com/news/music/app-album-cover-shazam-2306795, 12 pages.

Pascal et al., "Extracting and Composing Robust Features with Denoising Autoencoders", ICML '08 Proc. of the 25th Int. Conference on Machine Learning, pp. 1096-1103 (2008).

Redmon, J. et al., "YOLO9000: Better, Faster, Stronger", The IEEE Conference on Computer Vision and Pattern Recognition (CVPR), 2017, pp. 7263-7271.

Redmon, J. et al., You Only Look Once: Unified, Real-Time Object Detection, The IEEE Conference on Computer Vision and Pattern Recognition (CVPR), 2016, pp. 779-788.

Ren, S. et al., "Faster R-CNN: Towards Real-Time Object Detection with Region Proposal Networks", IEEE Transactions on Pattern Analysis and Machine Intelligence, vol. 39, Issue: 6 (2017), pp. 1137-1149.

Schroff et al., "FaceNet: A Unified Embedding for Face Recognition and Clustering", Proceedings of the 2015 IEEE Conference on Computer Vision and Pattern Recognition (CVPR), pp. 815-823 (2015).

Schultz et al., "Learning a Distance Metric from Relative Comparisons", NIPS'03 Proceedings of the 16th International Conference on Neural Information Processing Systems, pp. 41-48 (2003).

Uijlings, J.R.R. et al., "Selective Search for Object Recognition", International Journal of Computer Vision Sep. 2013, vol. 104, Issue 2, pp. 154-171.

Weaver, Patrick, "Record Player" (2018). Available at: https://record-player.glitch.me/auth.

Weinberger et al., "Distance Metric Learning for Large Margin Nearest Neighbor Classification", Journal of Machine Learning Research 10, pp. 207-244 (2009).

* cited by examiner

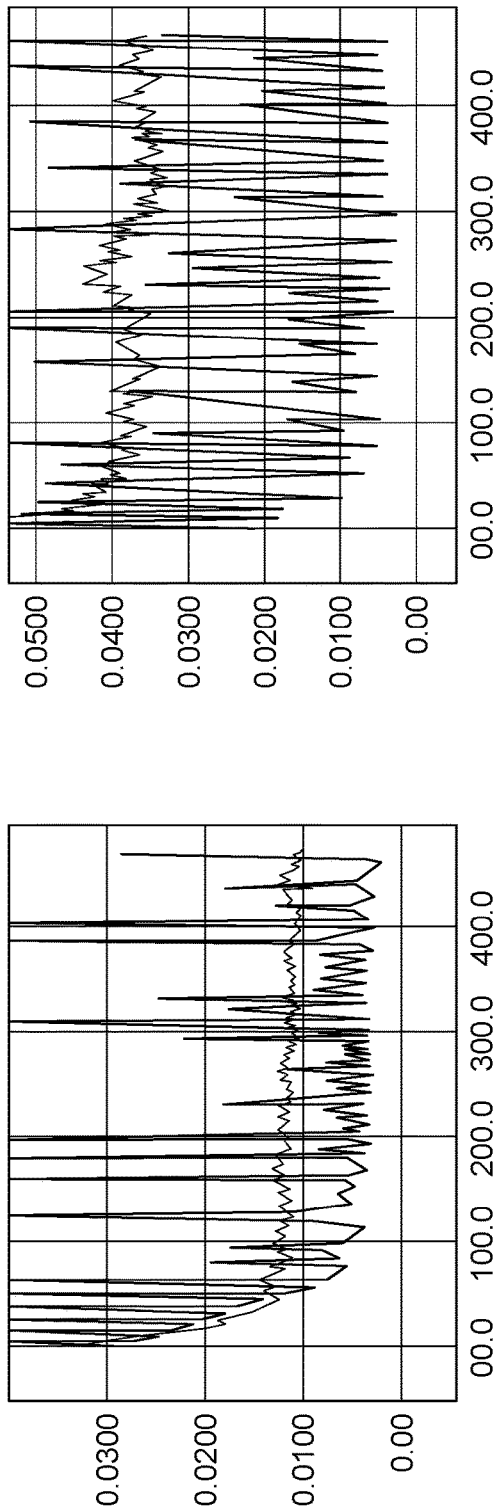
FIG. 8a
FIG. 8c
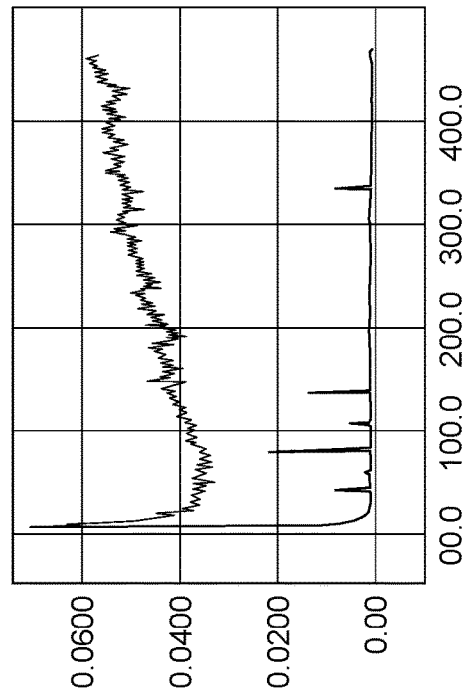
FIG. 8b
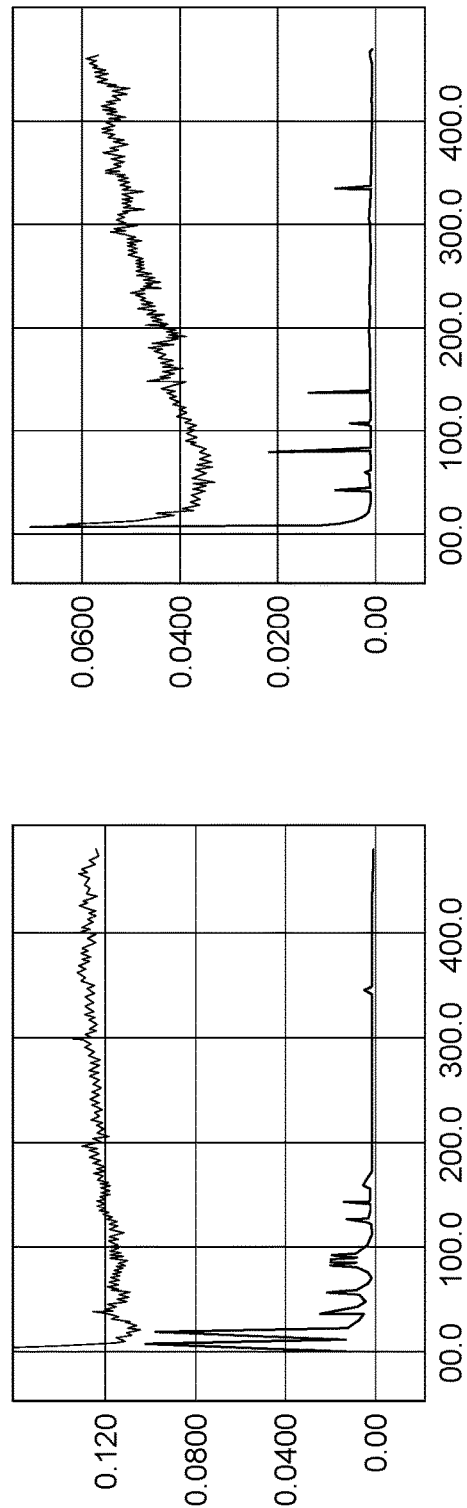
FIG. 8d

AUTOMATIC METADATA DETECTOR BASED ON IMAGES

CROSS-REFERENCE TO RELATED APPLICATION(S)

This application is a Continuation of U.S. application Ser. No. 16/452,319, filed on Jun. 25, 2019, titled AUTOMATIC METADATA DETECTOR BASED ON IMAGES, the disclosure of which is hereby incorporated by reference in its entirety. To the extent appropriate a claim of priority is made to the above-disclosed application.

BACKGROUND

Prior work can identify music, movies, advertising, and television shows based on audio samples obtained using a microphone and software. For example, an individual may hear a song that appeals to him/her, but may not be familiar with the name of the song, the musical artist, the album name, and the like. If interested in learning that information, the user can employ known software, such as Shazam, to automatically identify the applicable information based on an audio sample of the song. Such techniques are limited in that they rely on only audio samples versus other content.

It is with respect to these and other general considerations that embodiments have been described. Also, although relatively specific problems have been discussed, it should be understood that the embodiments should not be limited to solving the specific problems identified in the background.

SUMMARY

The foregoing and other limitations are overcome by a system, method and computer product for accessing content based on an input image. In one example embodiment herein, the method comprises processing at least one image with a classifier, and, in response to the at least one image being processed by the classifier, outputting from the classifier a value indicative of the likelihood that the at least one image belongs to at least one classification. The method also comprises determining whether the at least one image belongs to the at least one classification, based on the value, and accessing predetermined content when it is determined that the at least one image belongs to the at least one classification.

In one example aspect herein, the determining includes determining whether the value equals or exceeds a predetermined threshold, and the value includes at least one of a classification confidence score or a bounding box confidence score. Also, the predetermined content includes at least one of metadata or at least one audio track, and the metadata specifies at least one of a genre or an artist.

Also according to an example embodiment herein, the classifier includes a neural network, and the processing includes performing one of a Fast Region-based Convolutional Neural Network (Fast R-CNN) technique or a "You Only Look Once" (YOLO) technique to the at least one image.

In one example aspect herein, the method further comprises the classifier to learn images as belonging to the at least one classification. During training, the result of the determining is reviewed for accuracy, and correct as needed.

According to a further example embodiment herein, the at least one classification is a musical category, and the accessing comprises generating a recommendation musical playlist.

Preferably, the classifier is a fine tuned pre-trained model (also referred to as a "trained model" or "trained classifier") based on images from a database, wherein the training trains the classifier to classify at least some of the images from the database into predetermined classifications, such as, by example and without limitation, classifications by musical album, genre, concept, artist, composer, or the like.

Another example aspect is a system comprising: a computer processor; and a computer-readable storage device storing software instructions that, when executed by the computer processor, cause the computer processor to: process at least one image with a classifier; in response to the at least one image being processed by the classifier, output from the classifier a value indicative of the likelihood that the at least one image belongs to at least one classification; determine whether the at least one image belongs to the at least one classification, based on the value; and access predetermined content when it is determined that the at least one image belongs to the at least one classification.

Another example aspect is a computer-readable memory storing a program which, when executed by a computer processor, causes the computer processor to: process at least one image with a classifier; in response to the at least one image being processed by the classifier, output from the classifier a value indicative of the likelihood that the at least one image belongs to at least one classification; determine whether the at least one image belongs to the at least one classification, based on the value; and access predetermined content when it is determined that the at least one image belongs to the at least one classification.

BRIEF DESCRIPTION OF THE DRAWINGS

FIG. 8*a* is a graph showing example performance results obtained when a Fast R-CNN is employed for a classifier of the system of FIG. 1.

FIG. 8*b* is another graph showing example performance results obtained when a Fast R-CNN is employed for a classifier of the system of FIG. 1.

FIG. 8*c* is another graph showing example performance results obtained when a Fast R-CNN is employed for a classifier of the system of FIG. 1.

FIG. 8*d* is another graph showing example performance results obtained when a Fast R-CNN is employed for a classifier of the system of FIG. 1.

DETAILED DESCRIPTION

Figure 1:
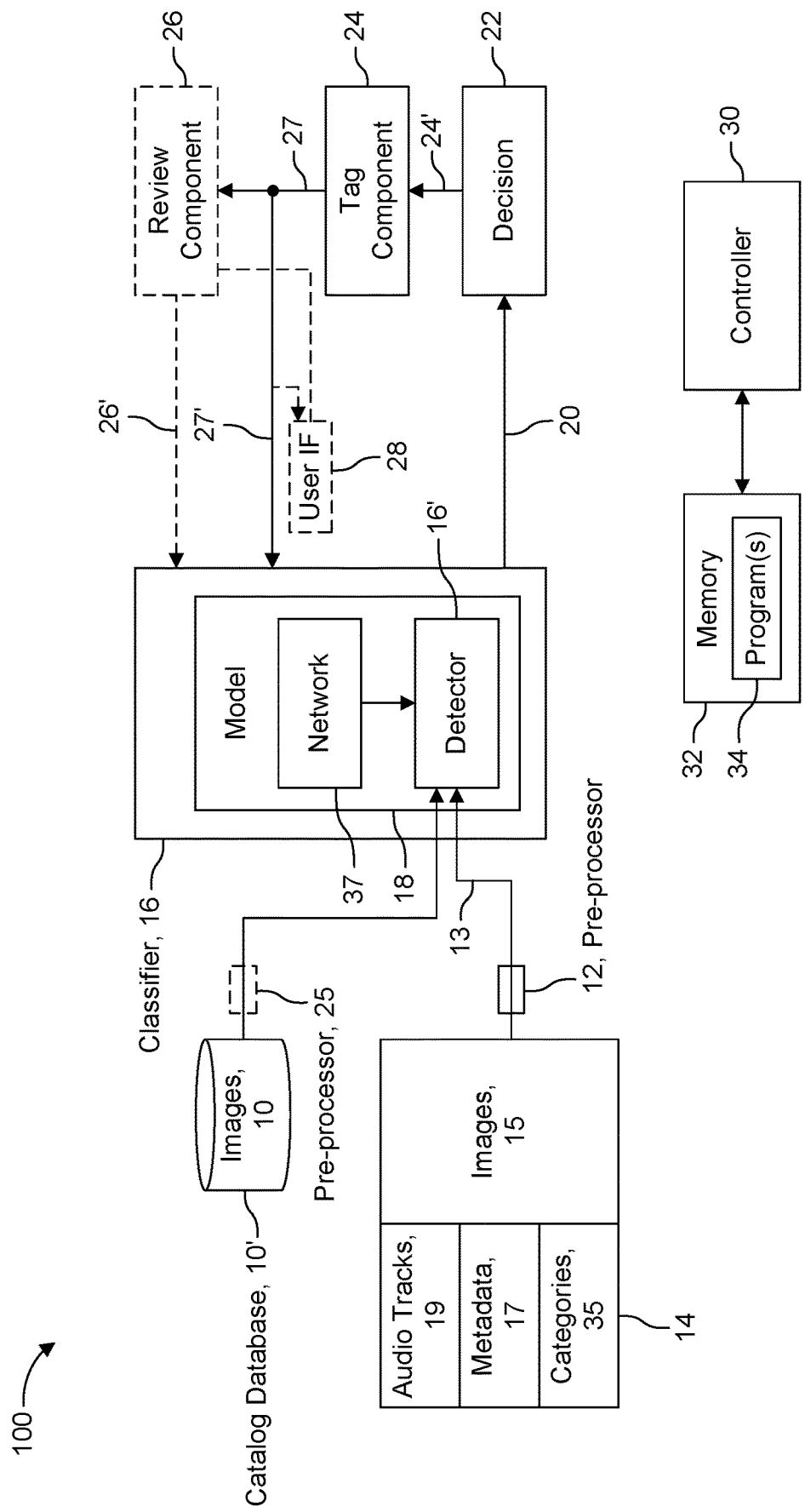
FIG. 1 shows an example of a system according to an example embodiment herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Prior techniques are lacking for being able to automatically identify and retrieve music or metadata associated with a song, genre, instruments, artist in the song, and the like, based on an image. For example, an individual may be interested in searching for a digital version of an album based on an image of the album cover art of the physical CD or record. Additionally the individual may also be interested in searching for the digital version of music performed by a particular artist based on the artist image from a live concert or merchandise such as posters, T-Shirts, etc. An individual may also be interested in determining which type of genre of music a musical album belongs to, or other types of metadata such as the name of the applicable musical artist(s), song titles/durations, or other information, based on an image of the album or the like. Similarly, a user may be interested in searching generally for music from a musical genre to which the musical album generally belongs, based on an image of the album. It would be useful to provide a mechanism for enabling a user to achieve these objectives.

The present technology involves systems, devices, methods, and computer programs that enable a user to access content, such as, for example and without limitation, audio (e.g., musical or non-musical) content or other types of information or metadata (e.g., a type of category or genre), based on an image. Examples of content that can be accessed in a musical context may include, by example and without limitation, musical tracks, musical albums, genres, indications of instruments, artists, genres, objects in album cover art, etc. An example method according to one embodiment herein comprises processing at least one image with a classifier, and, in response to the at least one image being processed by the classifier, outputting from the classifier a value indicative of the likelihood that the at least one image belongs to at least one classification. The method also comprises determining whether the at least one image belongs to the at least one classification, based on the value, and accessing predetermined content when it is determined that the at least one image belongs to the at least one classification.

The image may include content such as, for example and without limitation, album cover art of a musical album, cassette tape, CD, the actual CD, tape, or vinyl record itself, text, musical instruments, merchandise such as a T-shirt, a logo, art, poster, or an individual or group of individuals such as musical artists, etc. Some example embodiments herein can automatically generate recommendation playlists based on images, mine metadata about album tracks based on such images, and detect musical categories (e.g., devotional music, instrumental music, etc.) based on the images.

Example System

A system 100 for performing searching and recommendation and/or retrieval of content based on an input image, according to an example embodiment herein, will now be described, with reference to FIG. 1. The system 100 can be controlled by a controller 30 that operates under the control of one or more programs 34 stored in a memory 32, to control the overall operations and components of the system 100. Although not shown explicitly in FIG. 1 for convenience, the controller 30 may be connected to each of the various other components (in addition to memory 32) of the system 100 shown in FIG. 1. The program(s) 34 can include instructions for performing various procedures herein, such as, by example and without limitation, those shown in FIGS. 3 and 4.

The system 100 can be used by a user to, for example, obtain access to content relating to a captured image 10 (also referred to herein as "captured input image 10", "input image 10", and "image 10"). For example, the user may desire to obtain metadata (e.g., titles, artists, track durations, and/or album name(s), etc.) about and/or listen to one or more musical tracks of a musical album. As such, by way of one illustrative example, the user can capture or otherwise obtain an image of cover art of the album or other related content, and cause it to be stored in a catalogue database 10'. The user can then operate the system 100 to cause the image to be inputted into a classifier 16 (also referred to herein as an "object detection system") of the system 100 as input image 10, wherein, in response to the image 10 being inputted, the desired content is automatically retrieved and presented to the user in a manner to be described below. In another example scenario, the user may hear music that appeals to him/her at a concert or event or otherwise, but may not be familiar with a name or genre of a song being performed, an album on which the song appears, the artist(s), and/or the like, and/or the user may wish to access a digital version of the song. As such, the user may capture an image of the artist performing the song, an image of a T shirt or album cover art or other merchandise relating to the artist or music, or the like, and input it into the (classifier 16 of) system 100 as input image 10, wherein, in response to image 10 being inputted, the desired content is automatically retrieved and presented to the user in a manner as will described below. As another example scenario, the user may be interested in listening to one or more musical tracks, and/or obtaining metadata, relating to particular types of image content, such as, by example and without limitation, devotional content (or other types of content). As such, the user may capture an image having devotional content, and input it into the (classifier 16 of) system 100 as input image 10, wherein, in response to image 10 being inputted, the track(s) and/or metadata are automatically retrieved and presented to the user in a manner as will described below. Of course, the above examples are illustrative in nature, and the scope of the invention should not be construed as being necessarily limited thereto. There may be many other example scenarios for capturing content to be provided as the input image 10, and the captured image 10 may include any applicable content. By way of example and without limitation, the content of the captured image 10 may include cover art of a vinyl record, cassette tape, CD, the actual CD, tape, or a vinyl record itself, text, musical instruments, merchandise such as a T-shirt, a logo, art, poster, or an individual or group of individuals such as musical artists, concepts (e.g., drawings of Japanese gardens, an animal such as a dog, waterfall, devotional content such as a picture of Ganesha or other icon or devotional content, etc.), or any other subject matter. Also, the image 10 may be, for example and without limitation, a two-dimensional image, such as a photograph or screen display, although in other embodiments the image may be three-dimensional, such as a statue or hologram. The image may be captured by an optical device (not shown) such as a camera, mirror, lens, telescope, microscope, or another type of image capturing device (not shown). Also in one example embodiment, images 10 as described above may be stored in catalogue database 10' (also referred to as "database 10"), and the database 10' can be a proprietary database maintained by an entity, such as Spotify.

Referring again to FIG. 1, in one example embodiment herein the captured image 10 can be applied to a pre-processor (also referred to herein as an "image pre-processor") 25, although in other example embodiments no pre-processor 25 is employed (thus, the pre-processor 25 is shown in dashed lines as being optional). Various types of processing may be performed by the pre-processor 25 such as, for example and without limitation, suppressing unwanted distortions or enhancement of image features important for further processing, and transforming the image 10 into a predetermined format, such as, e.g., a 300×300 pixel image. The image pre-processor 25 performs the image processing to the image 10, and a resulting processed image is outputted and provided to the classifier 16, where the image is processed as will be described below. For convenience, images originating from the database 10' and input to the classifier 16, whether or not pre-processed by pre-processor 25, are referred to as input images 10.

Figure 7:
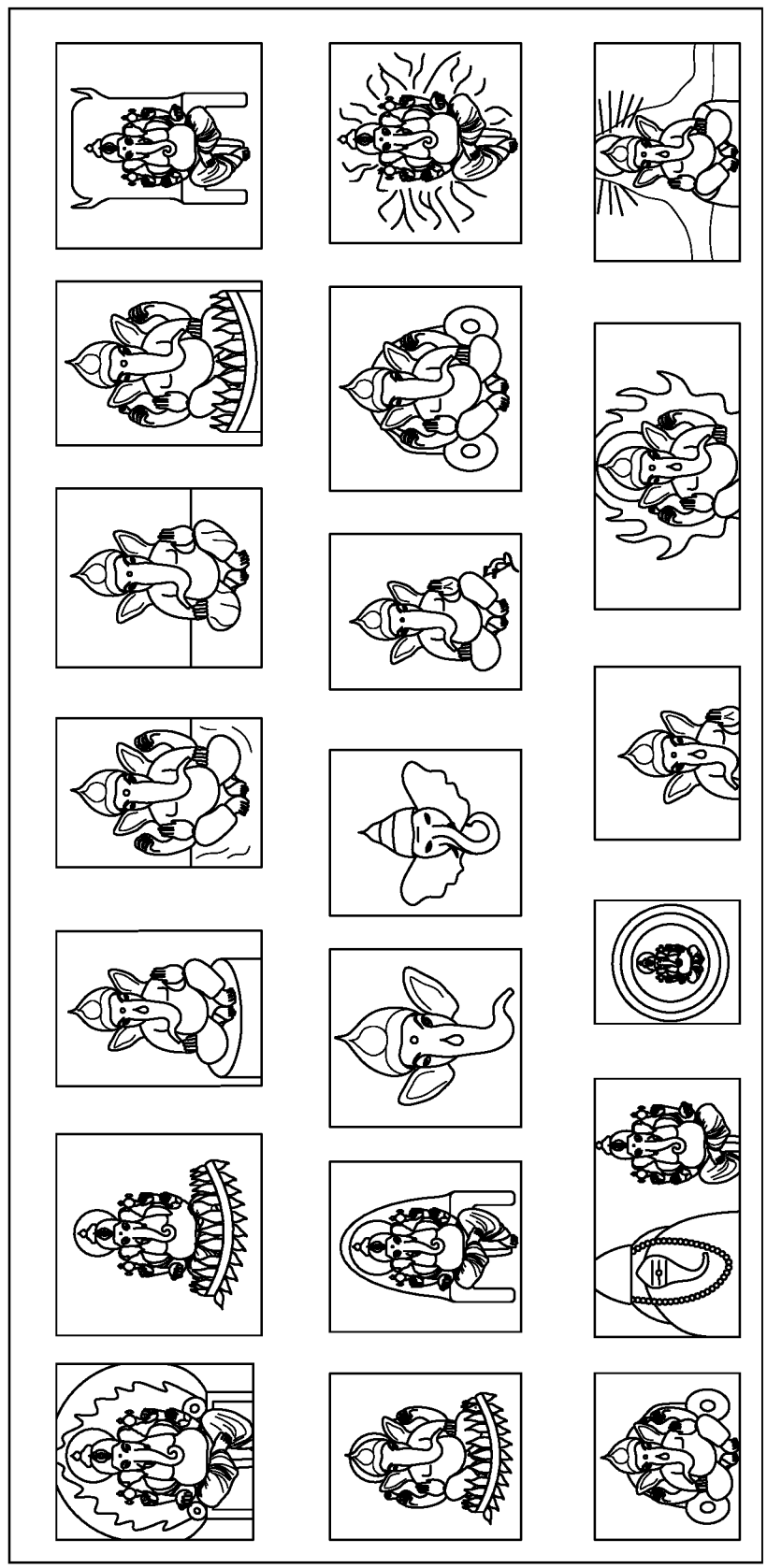
FIG. 7 shows an example of images used to train the system of FIG. 1.
Figure 9A:
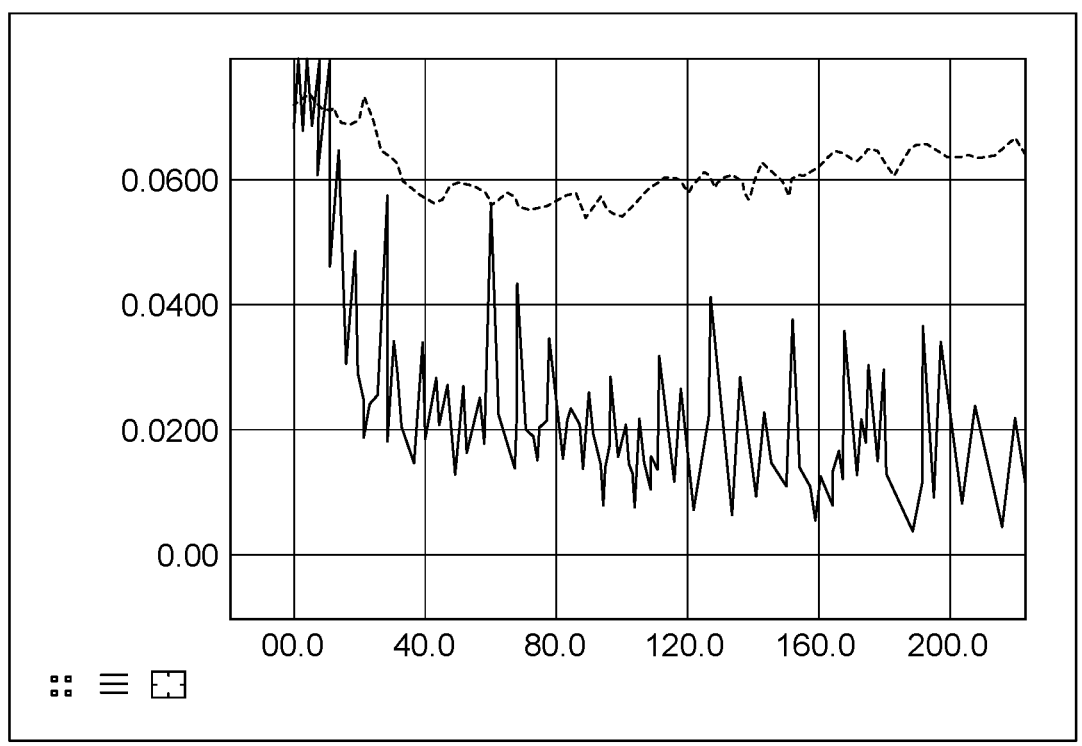
FIG. 9a is a graph showing additional example performance results obtained when a Fast R-CNN is employed for a classifier of the system of FIG. 1.
Figure 9B:
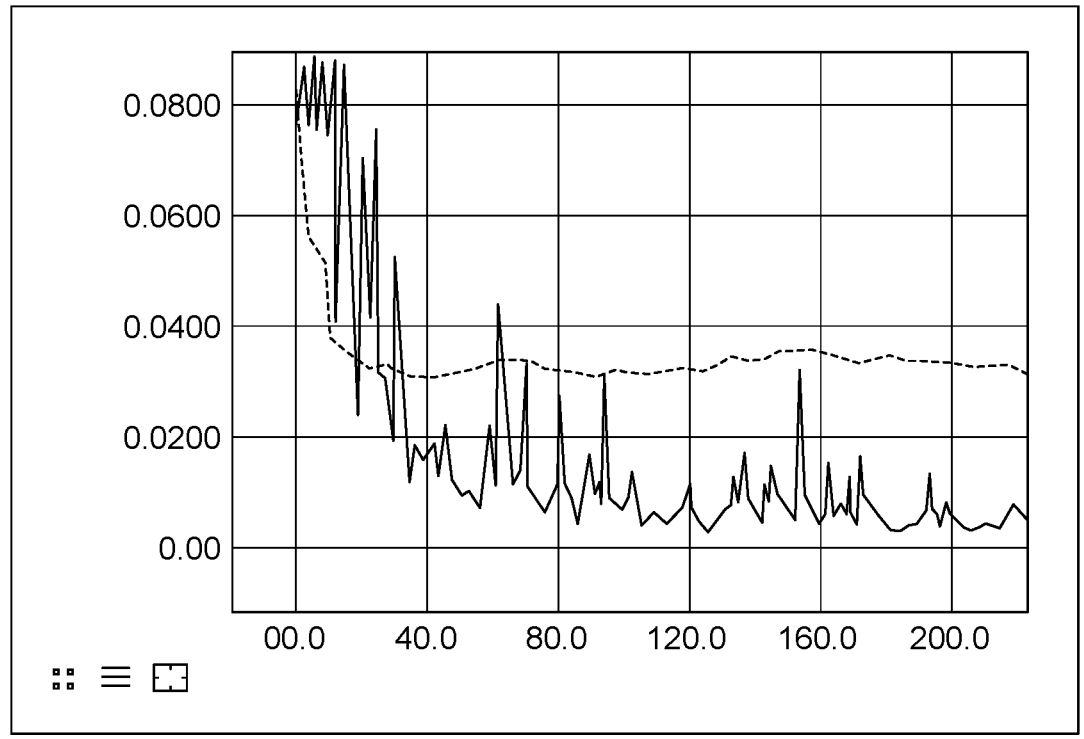
FIG. 9b is another graph showing additional example performance results obtained when a Fast R-CNN is employed for a classifier of the system of FIG. 1.
Figure 9C:
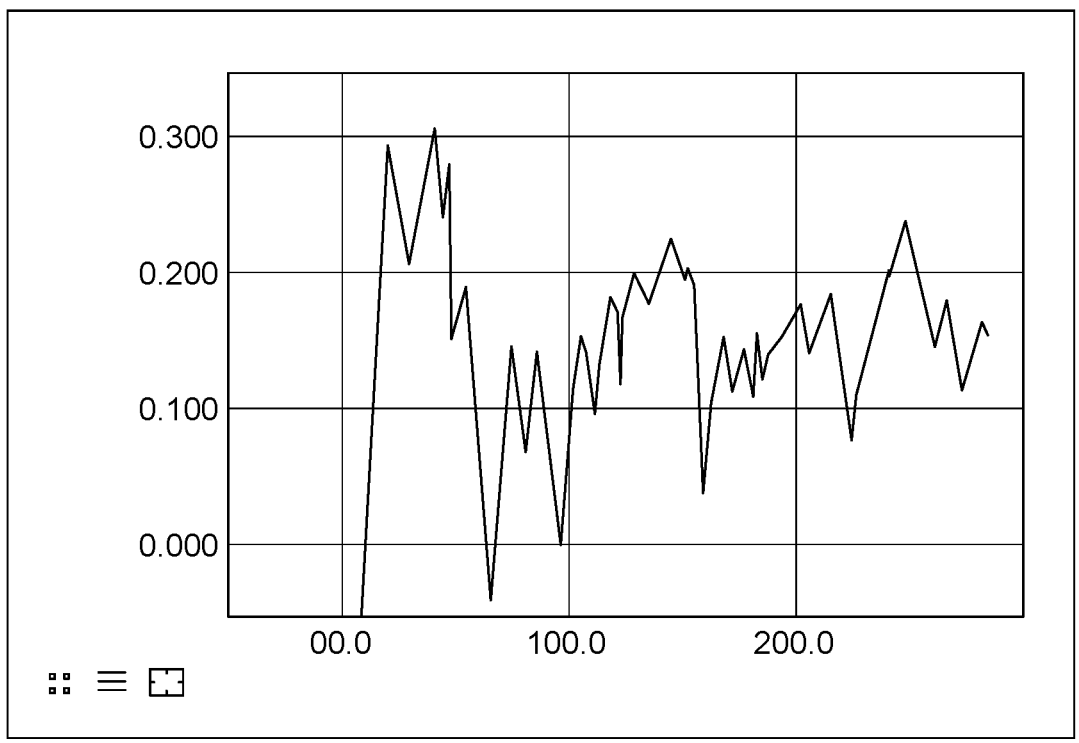
FIG. 9c is another graph showing additional example performance results obtained when a Fast R-CNN is employed for a classifier of the system of FIG. 1.
Figure 10A:
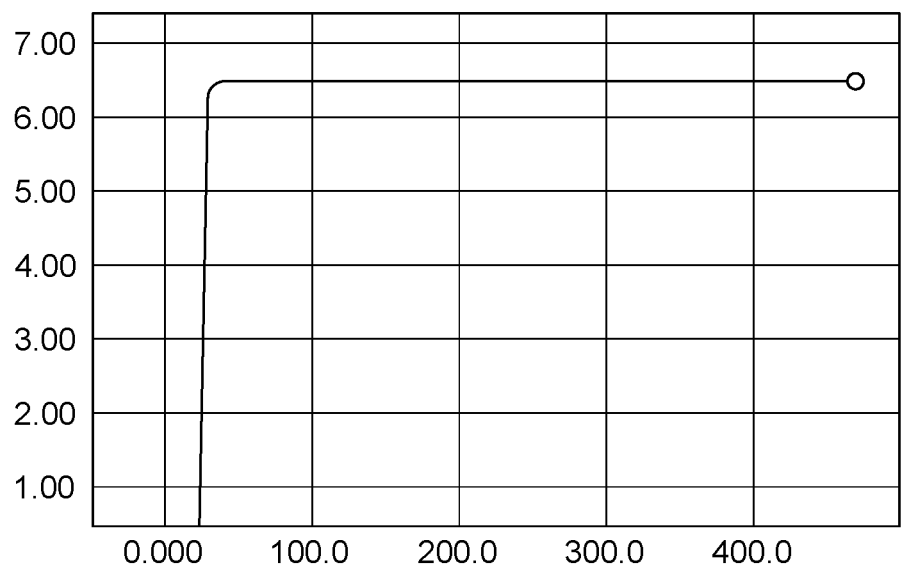
FIG. 10a is a graph showing further example performance results obtained when a Fast R-CNN is employed for a classifier of the system of FIG. 1.
Figure 10B:
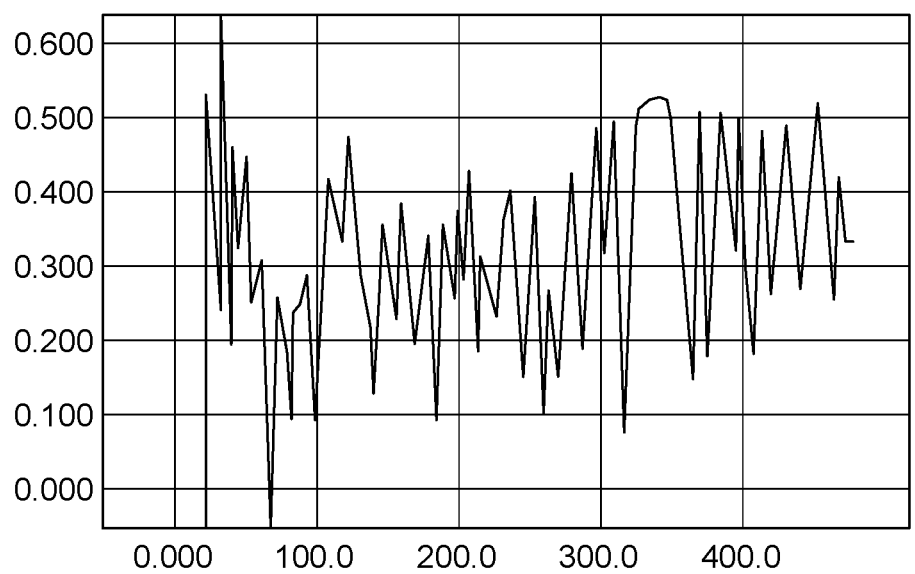
FIG. 10b is a graph showing further example performance results obtained when a Fast R-CNN is employed for a classifier of the system of FIG. 1.
Figure 10C:
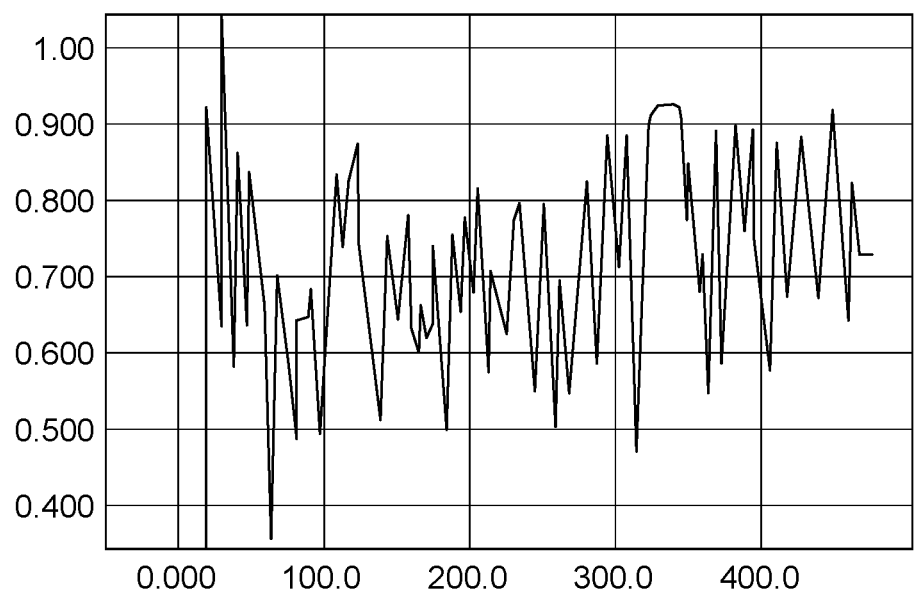
FIG. 10c is a graph showing further example performance results obtained when a Fast R-CNN is employed for a classifier of the system of FIG. 1.

Referring now to database 14 shown in FIG. 1, the database 14 stores images 15 that preferably are used to train the system 100. In one example embodiment herein, the images 15 include content associated with one or more categories which the system 100 is trained/to be trained to learn. By example and without limitation, depending on which categories it is desired for the system 100 to learn, the images 15 may include images of (or associated with) content from the categories, such as cars, animals, specific genre(s) or type(s) of music, musical artist(s), musical album(s), types of image(s) or photograph(s), musical album cover art, a cover of a vinyl record, cassette tape, CD, the actual CD, tape, or vinyl record itself, text, musical instruments, merchandise such as a T-shirt, a logo, art, poster, or an individual or group of individuals such as artists, concepts (e.g., Japanese gardens, an animal such as a dog, waterfall, devotional content such as a picture of Ganesha or other icon or devotional content, etc.), or any other subject matter and/or any other type(s) of content desired for the system 100 learn, as determined by the application of interest. In one example embodiment herein, the images 15 stored in the database 14 have a predetermined format, and are 300×300 pixel images, although this example is non-limiting. Also in example embodiment herein, at least some of the images 15 are scraped or otherwise obtained from the worldwide web (internet). For example, in one embodiment images 15 belonging to categories which the system 100 is to be trained to learn are searched for, obtained, and stored in the database 14. FIG. 7 shows an example of images of devotional content such as "Ganesha" obtained in a search of the same, wherein such images may be stored in the database 14 as images 15, for use in training the classifier 16 in a case where it is desired to train the classifier 16 to learn images of Ganesha and/or devotional content.

Before being applied to the classifier 16 for training (which will be described below), an image 15 first can be applied to a pre-processor 12 (also referred to herein as an "image pre-processor 12"). Various types of processing may be performed by the pre-processor 12 such as, for example and without limitation, suppressing unwanted distortions or enhancement of image features important for further processing, and transforming the image 15 into a predetermined format, such as, e.g., a 300×300 pixel image (if the image is not already in that format). The image pre-processor 12 performs the image processing to the image 15, and a resulting processed image 13 is outputted and provided to the classifier 16, where the image 13 is used to train the classifier 16 as will be described below. In other example embodiments, pre-processor 12 need not be employed.

Also in one example embodiment herein, the database 14 also stores information identifying categories (also referred to herein as "classifications") 35 that the system 100 is trained to learn, or will be trained to learn. Database 14 also stores one or more of music tracks 19 and/or metadata 17 associated with the categories 35. For example, for categories 35 such as a particular musical genre (e.g., devotional music, jazz, instrumental music, or the like), or cover art for a specific musical album, a concept (e.g., devotional content such as Ganesha) or the like, the database 14 may store at least one audio track (e.g., musical or other tracks) 19 from the corresponding categories, and/or metadata 17 stored in association with the corresponding categories 35. The metadata 17 may include information relating to the categories 35 and/or the at least one audio track 19. By example and without limitation, the metadata 17 may include titles and/or genres (e.g., "devotional music") of audio tracks 19 (or musical albums) belonging to the categories 35, album liner notes, authors, artists, composers, track durations, genres, and/or any other suitable type of text or other information related to the categories 35 and/or audio track(s). Of course, the scope of the invention is not limited only to the foregoing examples, and it is within the scope of the invention for other types of categories 35, metadata 17, and audio tracks 19 (i.e., besides musical tracks) to be employed.

Also shown in FIG. 1 is the classifier 16 (object detection system). In one example embodiment, the classifier 16 is trained based on images 15 from the database 14 to learn one or more predetermined categories 35 as mentioned above. In one example embodiment herein, the classifier 16 comprises a convolutional neural network (CNN) 37 trained to perform predetermined classifications. As known in the art, a CNN 37 can be used for machine learning, and employs a class of deep, feed-forward artificial neural networks that can be used to analyze and classify images. In one example embodiment herein, the CNN 37 includes 101 layers (although this example is not limiting or exclusive) and weights of the CNN 37 are adjusted during training in order to minimize classification errors. One example type of CNN 37 that can be employed by the classifier 16 is a Region-based Convolutional Neural Network (R-CNN) for object detection. A R-CNN can extract a plurality of regions (e.g., 2000 regions) from an image as image proposals. In one example embodiment herein in which a R-CNN is employed for CNN 37, the R-CNN can be in accordance with that described by Ross Girshick et al., entitled "Rich feature hierarchies for accurate object detection and semantic segmentation", The IEEE Conference on Computer Vision and Pattern Recognition (CVPR), 2014, pp. 580-587, (hereinafter "the Girshick publication I"); and/or that described by Ross Girshick, entitled "Fast R-CNN", The IEEE International Conference on Computer Vision (ICCV), 2015, pp. 1440-1448 ("the Girshick publication II"); and/or that described by S. Ren et al., entitled "Faster R-CNN: Towards Real-Time Object Detection with Region Proposal Networks", IEEE Transactions on Pattern Analysis and Machine Intelligence, Volume: 39, Issue: 6 (2017), pp. 1137-1149 (hereinafter "the Ren publication"); and/or that described by Rohith Gandhi, entitled "R-CNN, Fast R-CNN, Faster R-CNN, YOLO—Object Detection Algorithms", Towards Data Science, Jul. 9, 2018, appearing at towardsdatascience.com/r-cnn-fast-r-cnn-faster-r-cnn-yolo-object-detection-algorithms-36d53571365e (hereinafter "the Gandhi publication"), each of which is hereby incorporated by reference herein in its entirety, as if set forth fully herein. As described in those publications, in a R-CNN, region proposals are generated using a selective search algorithm, wherein the algorithm includes:

1. generating initial sub-segmentation, to generate candidate regions;
2. employing greedy algorithm to recursively combine similar regions into larger ones; and
3. employing the generated regions to produce final candidate region proposals.

The candidate region proposals can be formed into a square and provided to a convolutional neural network (e.g., CNN 37) that outputs a feature vector (e.g., a 4096-dimensional feature vector). In one example embodiment herein, extracted features of an image are employed to classify whether a predetermined object exists within the candidate region proposal. Also in one example embodiment herein, the determination is made using a Support Vector Machine such as that described by Rohith Ghandi, entitled "Support Vector Machine—Introduction to Machine Learning Algorithms (SVM Model by Scratch)", Towards Data Science, Jul. 7, 2018, appearing at towardsdatascience.com/support-vector-machine-introduction-to-machine-learning-algorithms-934a444fca47, which is hereby incorporated by reference herein in its entirety, as if set forth fully herein. Also in one example embodiment herein, a number (e.g., four) of offset values are predicted to increase precision of a bounding box, to help adjust the bounding box of a region proposal.

In another example embodiment herein, the selective search algorithm can be in accordance with that described by J. R. R. Uijlings et al., entitled "Selective Search for Object Recognition", International Journal of Computer Vision September 2013, Volume 104, Issue 2, pp. 154-171, which is hereby incorporated by reference herein in its entirety, as if set forth fully herein.

In an alternative example embodiment herein, the CNN 37 of the classifier 16 performs a Fast Region-based Convolutional Network (Fast R-CNN) method for object detection. In one example embodiment herein, the Fast R-CNN can be performed in the manner described in either of the Girschick I, Girshick II, Ren, or Ghandi publications, although those examples are non-limiting. As described in the Gandhi publication, for example, Fast R-CNN is similar to R-CNN but, instead of region proposals being fed to a convolutional neural network, the input image is input to such a network to generate a convolutional feature map. Based on the map, a region of proposals is identified and formed into squares. A pooling layer (e.g., a ROI pooling layer) is employed to reshape the squares into a size for being provided to a fully connected layer. A softmax layer can be employed to predict, based on the ROI feature vector, a class of the proposed region as well as offset values for a bounding box.

FIGS. 8*a*-8*d*, 9*a*-9*c*, and 10*a*-10*c* are graphs showing example performance results obtained when a Fast R-CNN is employed for a classifier of the system of FIG. 1.

In an alternative example embodiment herein, the CNN 37 of the classifier 16 classifies images using a "You Only Look Once (YOLO)" method for object detection. In one example embodiment herein, the YOLO method can be performed in the manner described in the Ghandi publication, although this example is non-limiting. As described in the Gandhi publication, YOLO is an object detection algorithm in which a single convolutional network predicts bounding boxes and class probabilities for these boxes.

As also described in the Ghandi publication, in YOLO an image is split into an S×S grid, and within each grid, m bounding boxes are formed, where "S" and "m" are each integers. For each bounding box, the network YOLO outputs a class probability as well as offset values for the box. Bounding boxes that have a class probability above a predetermined threshold can be selected and used to locate the object within the image. (In one example embodiment herein, such a determination may be made by decision block 22, as will be described below).

In another example embodiment herein, the YOLO method can be performed in the manner described in either of the following publications: (1) J. Redmon et al., entitled "You Only Look Once: Unified, Real-Time Object Detection", The IEEE Conference on Computer Vision and Pattern Recognition (CVPR), 2016, pp. 779-788, and (2) J. Redmon et al., entitled "YOLO9000: Better, Faster, Stronger", The IEEE Conference on Computer Vision and Pattern Recognition (CVPR), 2017, pp. 7263-7271. Each of the foregoing publications (1) and (2) is incorporated by reference herein in its entirety, as if set forth fully herein.

Referring again to FIG. 1, a detector 16' is shown included in the classifier 16, in one example embodiment herein. In one example embodiment herein, the detector 16' represents a component for performing object detection within an applied image (e.g., image 13 or 10), using one of the above-described methods, to generate at least one corresponding output 20 (e.g., during either training or real-time application, respectively). In one example embodiment herein the output 20 includes at least one of 1) a bounding box and coordinates thereof, 2) a bounding box confidence score, 3) a category (or class), and/or 4) a confidence score for the category (or class), as determined by the classifier 16. The bounding box is a bounding box for at least one object included in an image (e.g., image 10 or 13) input to the classifier 16, and the category (or class) is a category that the classifier 16 (and detector 16') assigns to the image, whether during training or real-time application. The assigned category may be one of the one of the predetermined categories 35 maintained in the database 14. The bounding box confidence score indicates a confidence level that the object is present within the bounding box, and the category confidence score indicates a confidence level that the object belongs to the category. In some example embodiments herein, there may be more than one bounding box, set of coordinates, category, and set of confidence scores, included in the output 20, if multiple objects in an image are identified and classified by the classifier 16. Also in one example embodiment herein, the CNN 37 and detector 16' form a model 18, such as an Object Management Group (OMG) model. Although the CNN 37 and detector 16' are represented as being separate components in FIG. 1, such a representation may be merely illustrative in nature, and, in other example embodiments, the CNN 37 and detector 16' may be a same element.

Figure 2:
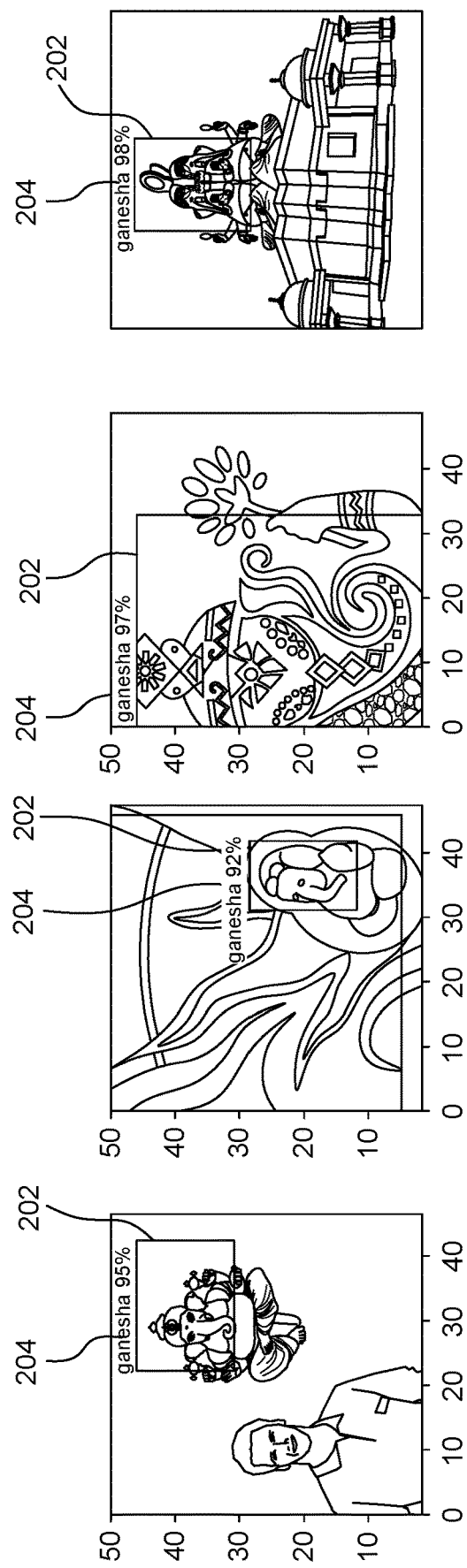
FIG. 2 shows examples of bounding boxes and corresponding confidence scores obtained from a classifier of the system of FIG. 1.

FIG. 2 shows examples of bounding boxes 202 and corresponding confidence scores 204 obtained (in output 20) from the classifier 16 in a case where the CNN 37 of the classifier 16 performs a Fast Region-based Convolutional Network (Fast R-CNN) to input images 10 or 13 in a case where the classifier is trained, or being trained, respectively, to learn Ganesha content in images.

Referring now to decision block 22, in one example embodiment herein the decision block 22 evaluates the output 20 from the classifier 16 to determine whether confidence score(s) included in the output 20 equal or exceed corresponding predetermined threshold values, and provides an output 24' indicating a result of the decision(s). In one non-limiting and non-exclusive illustrative example, the threshold value employed for the bounding box confidence score is 98%, and the threshold value employed for the category confidence score is 95%, although in other examples other values can be used, depending on the application of interest. In a case where the bounding box confidence score equals or exceeds its corresponding predetermined threshold value, then an object in the image being evaluated is deemed present and validly detected. If the bounding box confidence score does not equal or exceed the corresponding threshold value, then no object in the image is deemed present and validly detected. In a case where the category confidence score in output 20 equals or exceeds its corresponding predetermined threshold value, then the detected object is deemed to be within the predetermined category 35. If the category confidence score does not equal or exceed the corresponding predetermined threshold value, then the object in the image is deemed not to be within the predetermined category 35. The decision(s) made by decision block 22 are provided as output 24' to a tag component 24. In response to receiving the output 24' in a case where the output 24' indicates that the threshold values were equaled or exceeded, the tag component 24 issues a signal 27 indicating (e.g., with a tag or label) that the image under evaluation is within the predetermined category 35. In one example embodiment, the tag can be stored in association with the image under evaluation in the database 14 (or database 10'). In a case where the output 24' indicates that one or more of the threshold values were not equaled or exceeded, then, in one example embodiment herein, the signal 27 issued by the tag component 24 indicates (e.g., using a tag or label) that the image under evaluation is not within the predetermined category 35 (and, in one example embodiment, the tag/label can be stored in association with the image in the database 14 (or database 10'), although in other example embodiments no tagging is performed and the image is simply discarded from further evaluation in such a case.

In one example embodiment herein, such as for training the system 100/classifier 16, a review component 26 is employed in the system 100. In that embodiment, the review components 26 receives output 27 from the tag component 24, wherein the output 27 indicates the tag that was assigned (if any) to the image under evaluation by the tag component 24. In one example embodiment herein, the review component 26 automatically confirms whether the tag was assigned accurately by tag component 24. The review component 26 can make that determination based on predetermined operating criteria. In another example embodiment herein, review by the review component 26 can include, at least in part, review by one or more human operators/curators (not shown). By example only, one or more human operators can review a displayed version of the image under evaluation (e.g., by way of user interface 28) and make a visual determination as to whether the tag was accurately assigned by the tag component 24. In one example embodiment herein, the procedure performed by review component 26 can be performed by crowd sourcing. In another example embodiment herein, review by the review component 26 can be at least partly automatic and at least partly performed by one or more human operators, in combination. In any of the above embodiments, a result of the decision made by the review component 26 (e.g., either that the tag assigned by tag component 24 was accurate or inaccurate) is issued as signal 26' which is provided/fed-back to the classifier 16 (and the result also can be stored in one or both of the databases 10' and 14 in association with the image 10 under evaluation).

In another example embodiment herein, such as during real-time application of the system 100 for evaluating images, the output 27 from the tag component 24 is provided/fed-back directly to the classifier 16, as signal 27', without being provided to the review component 26.

As a result of the above process, images inputted to the classifier (e.g., image 10 or 13) can be classified as belonging to a particular class/category, or not. Also, the signals 26' and 27' can be employed to further train the classifier 16.

An example embodiment for training the classifier 16 and system 100 will now be described below.

Training

According to an example aspect herein, learning is framed as a classification task, wherein one or more classifications can be learned. For example, it may be desired to train the system 100 (and classifier 16) to learn to classify images as being associated with, or not being associated with, classes or categories 35 of one or more particular types. By example and without limitation, the class/category types may include one or more of particular musical genre(s) (e.g., devotional music, jazz, classical, rock, vocal, instrumental music, or the like), specific musical artist(s), specific musical album(s), automobiles (e.g., cars), animals, specific breeds or species of animals, musical artist(s), Hindu gods, particular audio track(s), concept(s), or any other desired type of category. Of course, the foregoing examples are non-limiting and non-exclusive, and there may be many other types of classifications as well, depending on applicable operating criteria.

Figure 3:
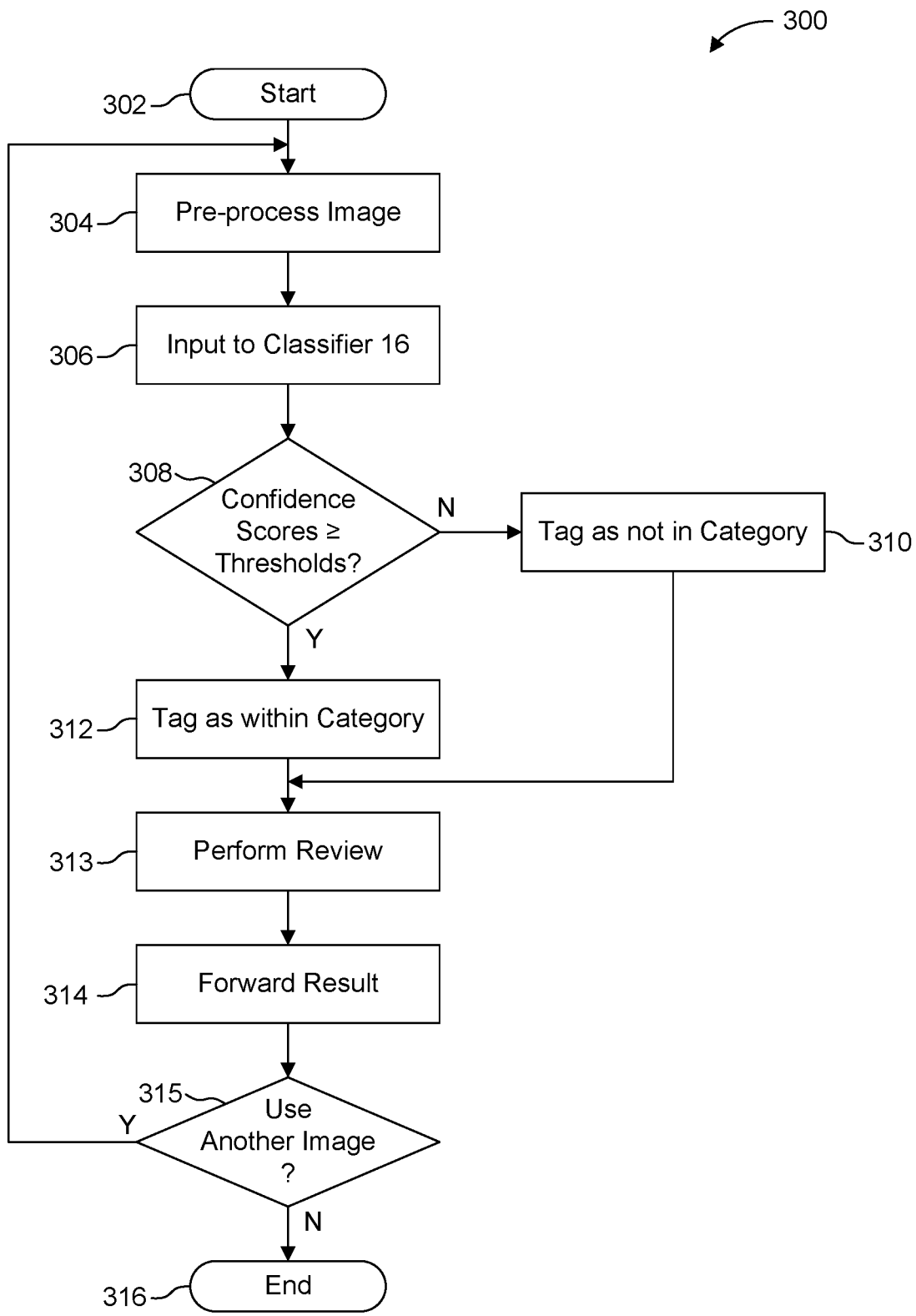
FIG. 3 is a flow diagram of the training procedure, according to an example embodiment herein.

A procedure 300 for sampling positive and negative observations to train the system 100/classifier 16 according to an example embodiment herein will now be described, with reference to FIG. 3, which illustrates a flow diagram of the procedure 300, and also with reference to the system 100 of FIG. 1.

The classifier 16, in one example embodiment herein, preferably has a known (uniform) bias and is trained by sampling positive (Y=1) and negative (Y=0) observations from images 13 (i.e., processed versions of images 15). In step 302 the training method is started, and in step 304 an image 15 from the database 14, to be used for training the overall system 100 (and classifier 16) is processed by the pre-processor 12 in the above-described manner, and a resulting pre-processed image 13 is then input to the classifier 16 (step 306).

In response to the input image 13, the classifier 16 operates as described above and provides output 20 representing one or more bounding boxes and one or more associated bounding box and category confidence scores (e.g., probabilities) in the manner described above (step 306). Referring now to decision block 22, in one example embodiment herein the decision block 22 evaluates the output 20 from the classifier 16 to determine whether the bounding box confidence score and the category confidence score indicated in the output 20 equal or exceed respective predetermined threshold values (step 308).

In a case where the decision block 22 determines that one or both of the confidence scores are less than the respective predetermined categories (i.e., no object has been detected in the image 13 and/or the image 13 does not belong to a predetermined category) ("No" in step 308), then the decision block 22 issues an output 24' indicating the same, and tag component 24 responds to the output 24' by providing an output 27 indicating (e.g., using a tag or label) that no object has been detected in the image 13 and/or that the image 13 does not belong to the category (step 310). Control then passes to step 313 which will be described below.

In a case where the decision block 22 determines, based on output 20, that both of the confidence scores equal or exceed the respective predetermined categories (i.e., which indicates that an object has been detected in the image 13 and belongs to a predetermined category) ("Yes" in step 308), then an output 24' indicating the same is provided to tag component 24, which responds by providing an output 27 indicating (e.g., using a tag or label) that an object has been detected in the image 13 and the image 13 belongs to the category (step 312). Control then passes to step 313.

Tag component 24 provides the output 27 to, in one example embodiment herein, the review component 26. In one example embodiment herein, the review component 26 automatically confirms (in step 313) whether the tag component 24 assigned an accurate tag. In one example embodiment, the review component 26 can make that determination automatically based on predetermined operating criteria. As but one non-limiting example, the review component 26 may check a tag assigned by the tag component 24 against information (e.g., a name, identification, pre-specified classification, or the like) associated with the image 13, wherein the information may be obtained from the database 10' or 14, or memory 32, and/or may be scraped from the internet along with the image 13.

In another example embodiment herein, review by the review component 26 in step 313 can include, at least in part, review by one or more human operators/curators (not shown). By example only, one or more human operators can review (in step 313) a displayed version of the original image 15 (e.g., by way of user interface 28) and make a determination as to whether the tag was accurately assigned by the tag component 24 in step 310 or 312, for the image. By example, assuming the system 100 is being trained to learn images of Ganesha as belonging to a devotional content category 35, but where an image 13 applied to the classifier 16 during training includes an elephant, but not Ganesha, and where the tag component 24 nonetheless identified the image 13 as being within the devotional content category 35 versus broadly "elephant" content in general, a determination may be made by the review component 26 that the image 13 was incorrectly classified (i.e., that there was a "false positive"). Similarly by example, assuming a similar scenario but where the tag component 24 incorrectly identified an image 13 of Ganesha as not including devotional content, but where review by the review component 26 indicates that the image 13 actually does include devotional content, then a determination can be made by the review component 26 that the image 13 was incorrectly classified as not including devotional content (i.e., that there was a "false negative").

Also in one example embodiment herein, it may be determined by the review component 26 in step 313 that one or more bounding boxes (e.g., originally identified in output 20 from classifier 16) have incorrect coordinates and inaccurately bound an object, and thus the signal 26' issued by review component 26 can indicate as such. Additionally, in one example embodiment herein, step 313 can include redrawing and/or varying coordinates of one or more bounding boxes that were determined by the classifier 16, or specifying a difference between coordinates assigned by the classifier 16 and actual correct coordinates determined to be correct in step 313, if it is determined that the bounding box(es) from the classifier 16 are not correctly located around an object of interest in the image 10 under consideration. By example, if it is determined that a vector V1 representing coordinates of a bounding box generated by the classifier should be vector V2, then output 26' can specify a value representing a difference of V2−V1, or simply vector V2. In another example, in a case where it is determined that a coordinates x1, y1 of a bounding box generated by the classifier should actually be coordinates x2, y2, then the output 26' can specify a value representing a difference of x2−x1, y2−y1, or simply values x2, y2. Any such procedures can result in the bounding box(es) being accurately re-drawn around the object. The resulting image having the corrected bounding box can then be fed back as signal 26' to the classifier 16, where it can be used in further training.

In one example embodiment herein, step 313 can be performed by crowd sourcing. In another example embodiment herein, review in step 313 can be performed at least partly automatically and at least partly by human operator, in combination. In any of the above embodiments, a result of the decision made in step 313 (e.g., either that the tag assigned in step 310 or 312 and/or the bounding box was accurate or inaccurate) is issued as signal 26' which is provided/fed-back to the classifier 16 (step 314) (and the result may be stored in database 14 and/or 10' in association with the original image 15). As a result, the classifier 16/system 100 will thereafter recognize that the image (15, 13) either belongs to the predetermined category 35 or does not belong to the category 35, depending on the outcome of steps 304-313. In step 315 it is decided whether to train the system 100 based on another image 15. If "Yes" in step 315, then control passes back to step 304 where the procedure 300 is performed again, but based on another image 15. If "No" in step 315, then the method ends (step 316).

In the foregoing manner, the system 100 is trained to learn images as belonging to predetermined categories 35. For each category 35 which the system 100 is being trained to learn, various images 15 can be employed that are deemed to fall within the category 35. For example, assuming the system 100 is being trained to learn images of Ganesha as a category 35, or images of Ganesha as belonging to a devotional content category 35, then various images 15 that include Ganesha as content can be employed to train the system 100 according to the method of FIG. 3.

The system 100 is trained based on images 15 such that, for positive cases where images have content of a particular type for which the system 100/classifier 16 is being trained to learn, the output 20 generated by the classifier 16 indicates, in one example embodiment herein, 1) a bounding box (and coordinates thereof) surrounding an object in the image deemed to include the particular type of content, 2) a bounding box confidence score that equals or exceeds a corresponding predetermined threshold (as determined by decision block 22), 3) an indication of the category (or class) 35 of the particular type of content, and/or 4) a confidence score for the category (or class), equaling or exceeding a corresponding predetermined threshold. As a result of such training, the tag component 24 assigns a tag value (e.g., Y=1) to the images having the particular type of content, such as, e.g., in real-time applications (involving images 10) to be described below. The classifier 16 also is trained such that, for negative cases where images not having the particular type of content are input to the classifier 16 (e.g., such as in real-time applications (involving images 10) to be described below), the resulting output 20 generated by the classifier 16 indicates that at least one of the confidence scores does not equal or exceed the corresponding predetermined threshold(s) (as determined by decision block 22). As a result, the tag component 24 assigns a tag value (e.g., Y='0') for negative cases where images not having the predetermined type of content are applied to the classifier 16. Values for positive (or negative) determinations may be stored, such as in the database 14 or in a separate memory, such as memory 32.

Figure 5A:
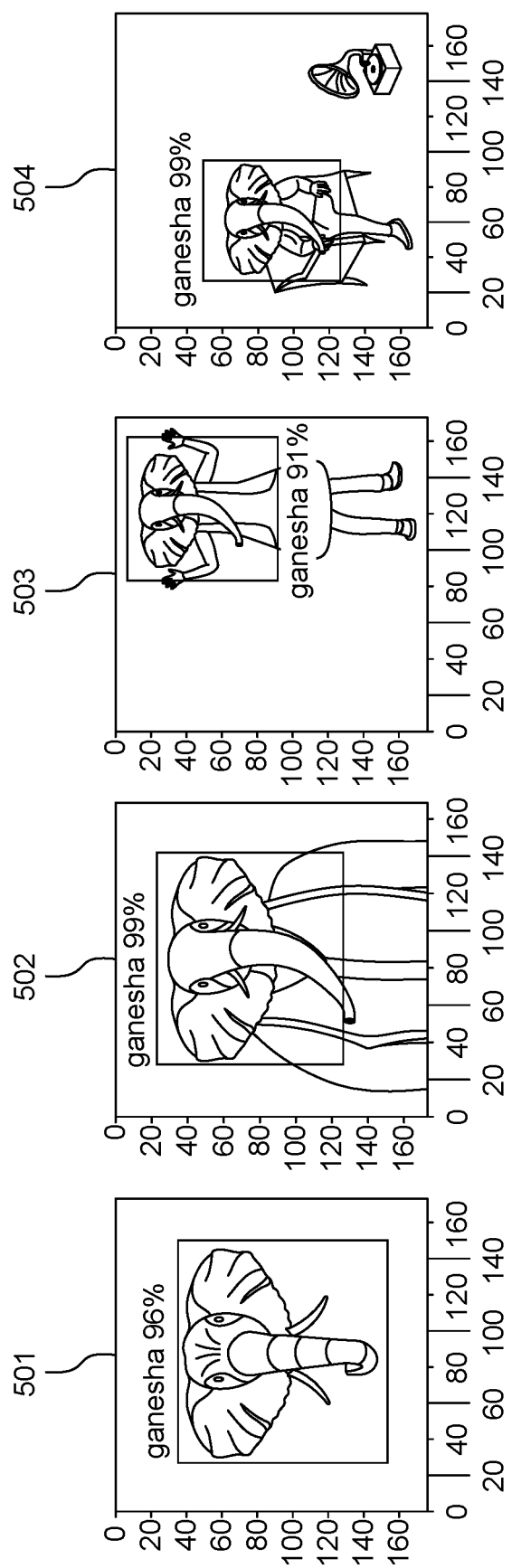
FIG. 5*a* shows example results involving false positive images and non-false positive images.
Figure 5B:
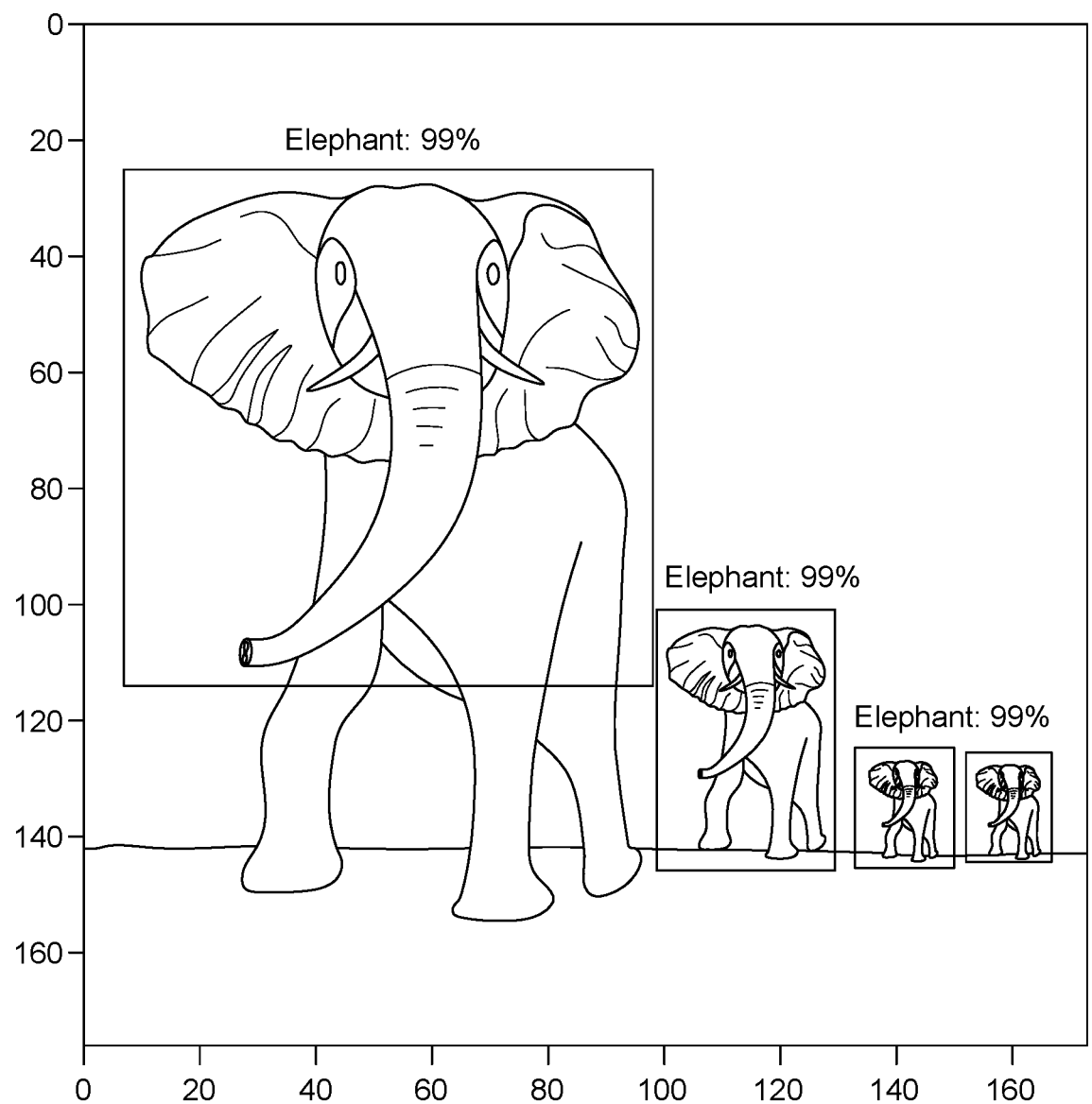
FIG. 5*b* shows an example of an image used for fine-tuning the classifier of the system of FIG. 1.
Figure 5C:
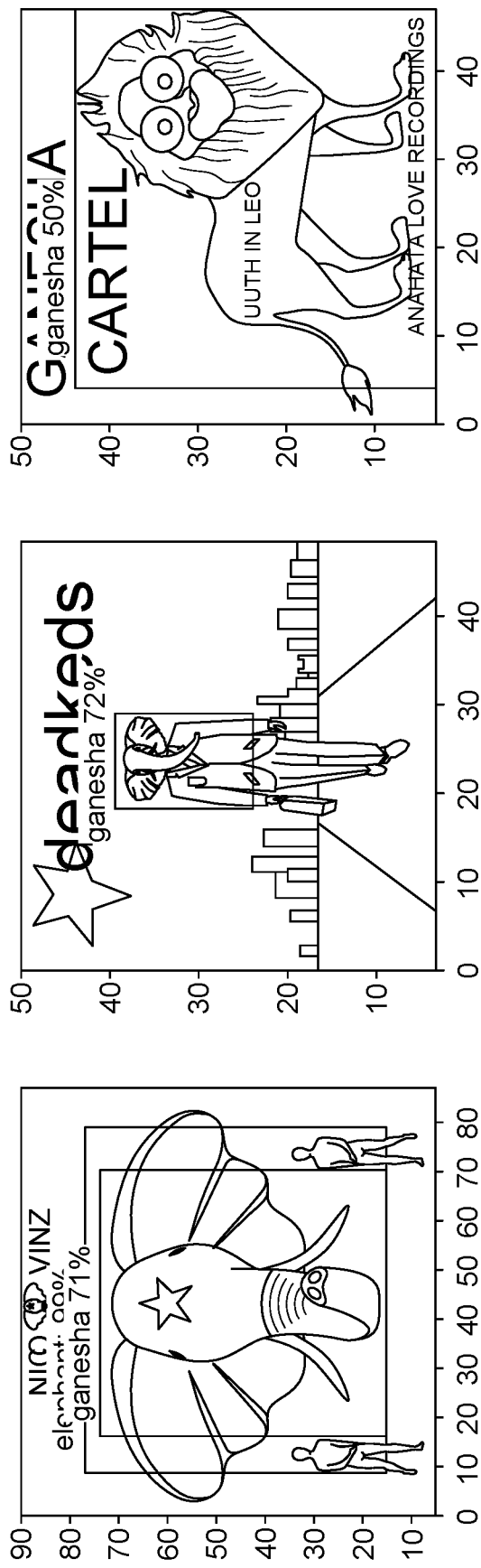
FIG. 5*c* shows an example of images classified in a broader "elephant" category and a narrower "Ganesha" category, according to one example embodiment herein.

An example scenario of the manner in which the classifier 16 may be trained will now be described. It should be appreciated, however, that the following examples are for purposes of illustration only, and the scope of the invention should not be construed as being necessarily limited only thereto. In one example scenario, it is assumed that it is desired to train the classifier 16 to learn images associated with a particular musical genre, such as devotional music. As such, images deemed to be associated with devotional content can be obtained (e.g., scraped from the internet) and stored as images 15 in the database 14. By example and without limitation, the images 15 may include images of gods (e.g., Hindu gods) or other content deemed devotional, such as those represented in FIG. 7. Other images 15 that are deemed not to include "devotional" content also can be stored in the database 14 for use in training the classifier 16 to identify images not included in that same classification, but which may be included in at least one other classification. For example, consider an example where system 100 has been trained to identify/classify images that include Ganesha, but where the system 100 has not yet been trained to identify elephants in general. In such an example scenario, if an image 10 including an elephant but not Ganesha is later input to the classifier 16 during a real-time application of the system 100, then it may occur that the classifier 16 would determine that the image 10 includes a representation of Ganesha with a high confidence score (e.g., 95%), even though the image does not in fact include Ganesha. FIG. 5a shows example results of such a scenario where images 502, 503, 504 of elephants but not Ganesha have bounding boxes drawn around the elephants, and where confidence scores are shown to be above 90%, as determined by classifier 16 (FIG. 5a also shows an image 501 that includes Ganesha content), indicating (incorrectly) that the images 502, 503, 504 were determined to include Ganesha. To correct for these types of situations, the system 100 can be fine-tuned with additional training, to learn to classify general elephant images (which do not include Ganesha) as being within an "elephant" category 35. For example, images like images 502, 503, 504 and the image shown in FIG. 5b, can be employed in the procedure 300 of FIG. 3, to train the system 100 to learn images that belong to the general "elephant" category 35. As a result of such training, when images (e.g., images 10 from database 10') of elephants in general are later input to the system 100 during real-time application thereof, such images will receive a high confidence score for the "elephant" classification 35, and a lower score (e.g., 75%) for the "Ganesha" classification, as represented in the example images shown in FIG. 5c. Thus, by training the system 100 to learn both images from a broader "elephant" category or domain, and images from a narrower "Ganesha" category or sub-domain, the system 100 can distinguish between both types of images with greater accuracy. Because of such training, the system 100 can learn more fine tuned features to enable such distinguishing. For example and without limitation, the system 100 may learn that, to detect/identify an object as an "elephant" in an image, the object has to be a shade of grey in color, have large ears, nothing on top of its head, no jewelry, no accessories, no clothing on it, or the like, whereas to detect/identify an object as "Ganesha" in an image, the object would have accessories, jewelry, clothing, and/or the like. Thus, an image having such "Ganesha" features would be classified by the system 100 as being within the "Ganesha" category, with a higher confidence score than within an "elephant" category.

Real-Time Application

Figure 4:
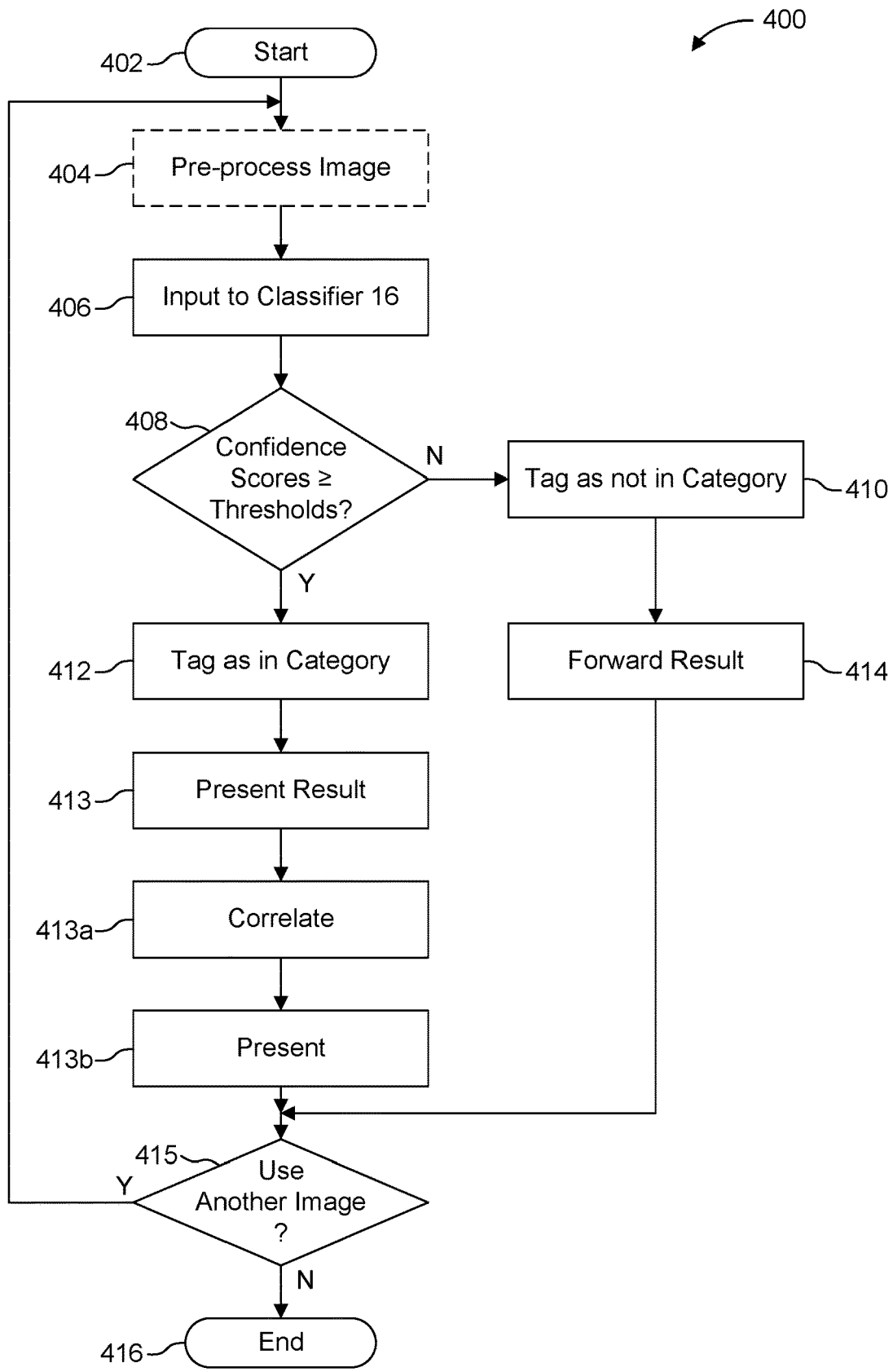
FIG. 4 is a flow diagram of a procedure for accessing content based on an input image in a real-time application, according to an example aspect herein.

Referring again to FIG. 1 in conjunction with procedure 400 of FIG. 4, the manner in which the system 100 operates to access content based on a captured input image 10 in a real-time application will now be described. In one example scenario, the image 10 may be received from a user (e.g., by way of a user interface) or obtained from database 10' (step 402), and the image 10 includes "devotional" content, such as, for example, an image of Ganesha, or other devotional content. The user may desire to listen to devotional music, obtain metadata about devotional music, and/or determine which genre (e.g., musical genre) the image 10 falls within, for example, and instructs the system 100 accordingly by inputting the image 10 into system 100, or causing it to be retrieved from database 10' (step 402).

In one example embodiment herein, the image 10 may be input to pre-processor 25 where it is processed as described above (although in other example embodiments the image 10 need not be so pre-processed) (step 404), and then provided to the classifier 16.

In response to the image 10 (whether pre-processed or not) being inputted to the classifier 16, the classifier 16 operates as described above and provides output 20 representing one or more bounding boxes and one or more associated confidence scores (e.g., probabilities) in the manner described above (step 406). Referring to decision block 22 of FIG. 1, in one example embodiment herein the decision block 22 then evaluates the output 20 from the classifier 16 to determine whether both the bounding box confidence score and the category confidence score indicated in the output 20 equal or exceed predetermined corresponding threshold values (step 408).

In a case where the decision block 22 determines that one or both of the confidence scores are less than the respective predetermined categories (i.e., no object has been detected in the image 10 and/or the image 10 does not belong to a predetermined category) ("No" in step 408), then the decision block 22 issues an output 24' indicating the same, and tag component 24 responds to the output 24' by providing an output 27 indicating (e.g., using a tag or label) that no object has been detected in the image 10, and/or that the image 10 does not belong to the category (step 410). The procedure then proceeds to step 414 where the output 27 indicating that result can be forwarded as signal 27' back to classifier 16 (where, in one example embodiment herein, it can be used for further training the system 100), or it can be discarded. A user also can be notified of the result by way of user interface 28 (FIG. 1). Thereafter, in step 415 it is decided whether the system 100 has been instructed to process another image using procedure 400. If "Yes" in step 415, then control passes back to step 404 where the procedure 400 is performed again, but based on another image 10. If "No" in step 415, then the procedure ends (step 416).

Referring again to step 408, in a case where the decision block 22 determines, based on output 20, that both of the confidence scores equal or exceed the respective predetermined categories (i.e., which indicates that an object has been detected in the image 10 and belongs to a predetermined category) ("Yes" in step 408), then an output 24' indicating the same is provided to tag component 24, which responds by providing an output 27 indicating (e.g., using a tag or label) that an object has been detected in the image 10 and the image 10 belongs to the category (step 412).

In one example embodiment herein, the output 27 can be forwarded as output 27' to user interface 28 for being presented to the user in step 413 (also, in one example embodiment herein, that output 27' can be fed back to classifier 16). In response to receiving the output 27', the user interface 28 can notify the user the determined classification(s) of the input image 10 (e.g., as tagged in step 412). By example, in a case where the input image 10 included Ganesha, and was determined in step 412 as belonging to a predetermined "devotional" classification 35, then the user interface 28 can present that classification to the user. The user interface 28, in one example embodiment, includes an input user interface for enabling the user to enter commands, interact with presented content, and the like, and also includes an output user interface that enables the user to perceive outputted information. The interface 28 may include a display, microphone, speaker, keyboard, or any other type of input/output user interface. Also, although the interface 28 is shown as a singular interface 28 in FIG. 1, it should be appreciated that the interface 28 may include more than a single interface.

In one example embodiment herein, the user interface 28 can query the user as to whether the user wishes to access content relating to the presentation made in step 413 (e.g., an indication of the "devotional" genre), such as metadata 17 and/or one or more audio tracks 19 that fall within or are associated with the genre. Then, in a case where, for example, the user operates the user interface 28 to specify that metadata 17 and/or one or more tracks 19 from the genre should be accessed, the system 100 responds in step 413a by correlating the selection to corresponding metadata 17 and/or track(s) 19 (e.g., stored in database 14, or elsewhere), and retrieving that content, and then, in step 413b, by presenting it to the user by way of user interface 28. For example, in step 413b the user interface 28 can display the retrieved metadata 17, and/or play the retrieved track(s) 19 to the user (or enable the user to select the track(s) for being played to the user, in which case they are played). Thereafter, control passes to set 415 which is performed in the manner described above. In this manner, a user can be provided with metadata and/or musical tracks by inputting an image 10 to the system 100, relating thereto. This provides convenience for the user in that the user does not need to search manually through the database 14 for desired content such as metadata and/or tracks, relating to the captured image 10.

In example embodiment, performance of the procedure 400 may result in a determination that the image 10 belongs to more than one predetermined category 35, and results presented to the user in step 413 may include the top K results (e.g., categories 35) identified based on the image 10 (where, for example, the order of the K results is determined based on the confidence scores). For example, the results may indicate that the image 10 correlated to one or more of K classes, such as K musical albums or musical genres. The user can then operate the user interface 28 to select one of the classes such that one more related musical tracks and/or metadata can be retrieved and perceived by the user in the above manner.

In another example embodiment herein, the system 100 can present and/or recommend a track playlist to the user. For example, step 413 can include the system 100 presenting via user interface 28 a playlist recommendation relating to the category identified in step 412 (a playlist corresponding to the determined classification), in which case the user can select the playlist, and tracks from the playlist are retrieved (step 413a) and presented to the user in the above-described manner (step 413b). One example of the manner in which a playlist can be generated and accessed is described in U.S. Pat. No. 9,626,436, issued Apr. 18, 2017, by Roger et al., which is incorporated by reference herein in its entirety. For example, in one example embodiment herein, as described in U.S. Pat. No. 9,626,436, recommendation of a playlist involves an application programming interface (API) receiving a request to generate a playlist, where the request includes a set of rule-primitives. A playlist engine evaluator evaluates a rule corresponding to each rule-primitive in the set of rule-primitives across a catalog of media content, calculates a cost associated with each item in the catalog of media content, and generates a playlist based on the items of the catalog having the lowest costs.

In one example embodiment herein, the recommended playlist includes tracks relating to the selected classification, and other tracks. In still another example embodiment herein, metadata is retrieved and presented to the user, as well.

Content retrieved in step 413a and presented to the user in step 413b also can be saved by the user to, e.g., database 14, 10' and/or memory 32, for later access, by virtue of the user operating the user interface 28 to specify that the content be saved, wherein in response thereto, the content is saved in the database 14, 10' and/or memory 32. Also, the system has a capability for enabling the user to share content retrieved in step 413a and presented to the user in step 413b. For example, in response to the user operating the user interface 28 to specify that content (e.g., a musical track and/or metadata) presented in step 413b be shared with another user identified by information inputted to the interface 28 by the user, the system 100 forwards the content to the other user.

Figure 6:
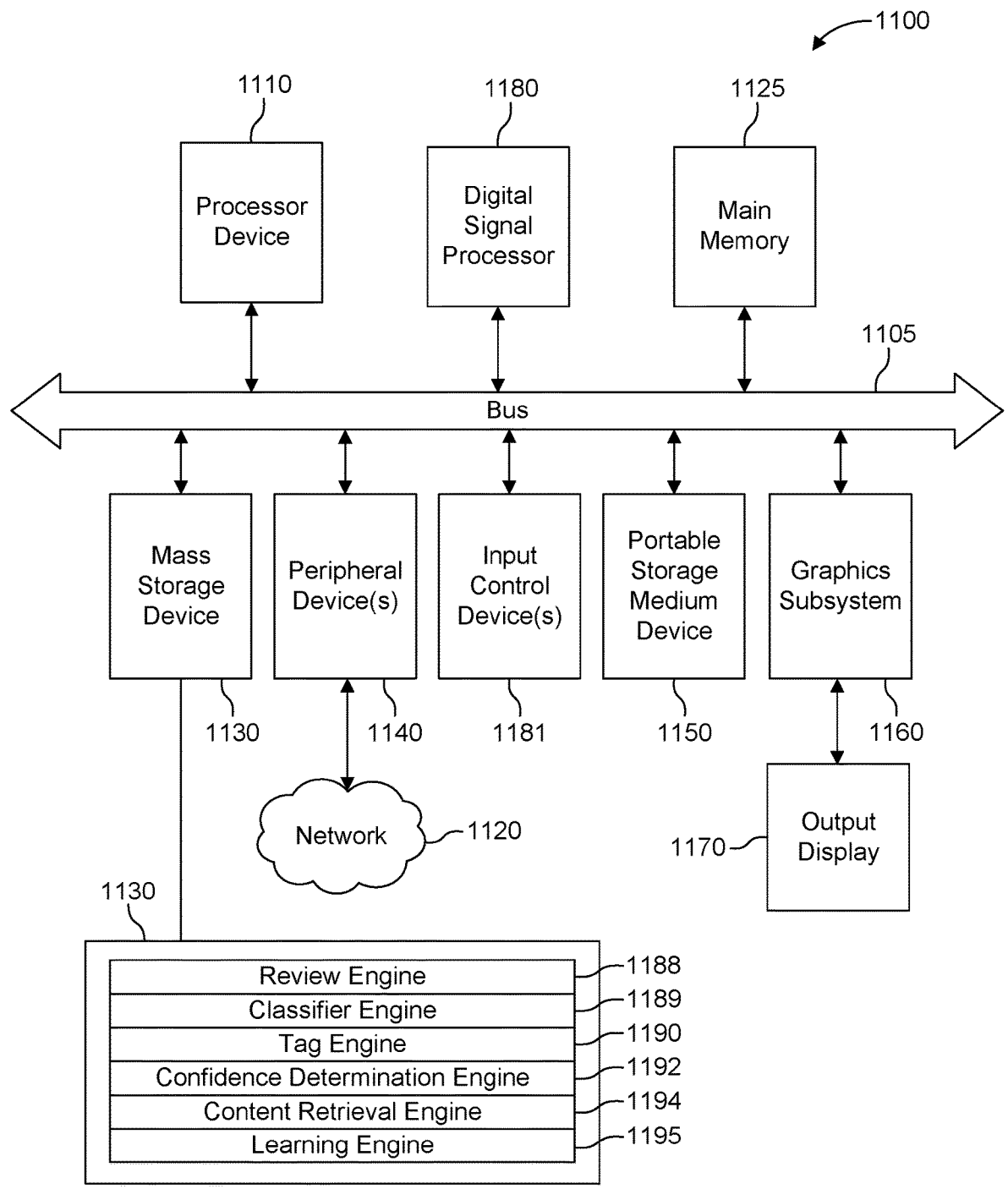
FIG. 6 is a block diagram showing an example computation system constructed to realize the functionality of the example embodiments described herein.

FIG. 6 is a block diagram showing an example computation system (also referred to herein as a "computer") 1100 constructed 1100 to realize the functionality of the example embodiments described herein. Computation system 1100 may include without limitation a processor device 1110 (which, in one example embodiment, further represents controller 30 of FIG. 1), a main memory 1125, and an interconnect bus 1105. The processor device 1110 may include without limitation a single microprocessor, or may include a plurality of microprocessors for configuring the system 1100 as a multiprocessor computation system. The main memory 1125 stores, among other things, instructions and/or data for execution by the processor device 1110. The main memory 1125 may include banks of dynamic random access memory (DRAM), as well as cache memory, and, in one example embodiment, further represents the memory 32 of FIG. 1 described above.

The system 1100 may further include a mass storage device 1130 (which, in one example embodiment, further represents database 14 and/or 10' of FIG. 1 described above), peripheral device(s) 1140, portable non-transitory storage medium device(s) 1150, input control device(s) 1181, a graphics subsystem 1160, and/or an output display interface (also referred to herein as "output display") 1170. A digital signal processor (DSP) 1180 may also be included to perform audio signal processing. For explanatory purposes, all components in the system 1100 are shown in FIG. 6 as being coupled via the bus 1105. However, the system 1100 is not so limited. Elements of the system 1100 may be coupled via one or more data transport means. For example, the processor device 1110, the digital signal processor 1180 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1130 may be a nonvolatile storage device for storing data and/or instructions for use by the processor device 1110. The mass storage device 1130 may be implemented, for example, with a magnetic disk drive or an optical disk drive. In a software embodiment, the mass storage device 1130 is configured for loading contents of the mass storage device 1130 into the main memory 1125. Mass storage device 1130 additionally stores a learning/estimator engine 1195 for learning classifications of content such as images, a classifier engine 1189 for determining classifications for inputted images, and a confidence determination engine 1192 for determining confidence scores based on an output of engine 1195 and/or 1189 and comparing the confidence scores to predetermined threshold. Mass storage device 1130 also stores a tag engine 1190 to tag (based on an output of engine 1192) an image as being within or not within a predetermined category, and/or as including or not including an object within bounding box, a review engine 1188 for determining the accuracy of determinations made by engine 1190, and a content retrieval engine 1194 for accessing content (e.g., metadata and/or musical tracks) based on a user command and/or an output of engine 1190.

The portable storage medium device 1150 operates in conjunction with a nonvolatile portable storage medium, such as, for example, a solid state drive (SSD), to input and output data and code to and from the system 1100. In some embodiments, the software for storing information may be stored on a portable storage medium, and may be inputted into the system 1100 via the portable storage medium device 1150. The peripheral device(s) 1140 may include any type of computer support device, such as, for example, an input/output (I/O) interface configured to add additional functionality to the system 1100. For example, the peripheral device(s) 1140 may include a network interface card for interfacing the system 1100 with a network 1120.

The input control device(s) 1181 provide a portion of the user interface for a user of the system 1100. The input control device(s) 1181 (which may further represent user interface 28 of FIG. 1) may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 1100 may include the graphics subsystem 1160 and the output display 1170. The output display 1170 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays.

In one example embodiment herein, at least one of the input control device(s) 1181 and the output display 1170, may form the user interface 28 of FIG. 1.

The graphics subsystem 1160 receives textual and graphical information, and processes the information for output to the output display 1170.

Input control devices 1181 can control the operation and various functions of system 1100.

Input control devices 1181 can include any components, circuitry, or logic operative to drive the functionality of system 1100. For example, input control device(s) 1181 can include one or more processors acting under the control of an application.

Each component of system 1100 may represent a broad category of a computer component of a general and/or special purpose computer. Components of the system 1100 are not limited to the specific implementations provided herein. The system 1100 may further represent the system 100 of FIG. 1, in one example embodiment. In one example embodiment, the system 1100 is any suitable type of media content access and/or player device, and may be included in a portable, hand-held configuration, a desktop configuration, or any other suitable type of configuration. As such, the user can employ the system 1100 to access desired content using any suitable type of media content device.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result. A computer-readable storage device is a computer-readable medium embodied as a hardware device.

Some embodiments may also be implemented by the preparation of application-specific integrated circuits, fieldprogrammable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIG. 6 is presented for example purposes only. The architecture of the example embodiments presented herein is sufficiently flexible and configurable, such that it may be utilized (and navigated) in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for training a classifier to identify images belonging to a predetermined category, the method comprising:
receiving positive training images and negative training images;
detecting a first object in at least some of the positive training images and a second object in at least some of the negative training images; and
training the classifier to determine the first object as belonging to the predetermined category and the second object as not belonging to the predetermined category;
wherein, the classifier is trained to output a value indicative of a likelihood that an image belongs to the predetermined category.

2. The method of claim 1, the method further comprising:
receiving a particular image to process with the classifier;
outputting a value indicative of a likelihood that the particular image belongs to the predetermined category;
determining whether the particular image belongs to the predetermined category based on the value; and
assigning a tag to the particular image, the tag indicating whether the particular image was determined to belong to the predetermined category.

3. The method of claim 2, wherein determining whether the particular image belongs to the predetermined category based on the value further includes determining whether the value equals or exceeds a predetermined threshold.

4. The method of claim 2, wherein a notification is displayed on a user interface indicating whether the particular image was determined to belong to the predetermined category.

5. The method of claim 2, the method further comprising:
storing the particular image with the assigned tag in a database.

6. The method of claim 2, further comprising:
reviewing a result of the determining for accuracy.

7. The method of claim 2, wherein the particular image is preprocessed prior to being received.

8. The method of claim 1, the method further comprising:
correlating the predetermined category to media content items.

9. The method of claim 1, wherein the predetermined category is a musical category.

10. The method of claim 1, wherein the value includes at least one of a classification confidence score or a bounding box confidence score.

11. The method of claim 1, wherein the classifier includes a neural network, and the processing includes performing one of a Fast R-CNN or a YOLO technique to the image.

12. A system comprising:
a database storing a plurality of training images including positive training images and negative training images;
a computer processor; and
a computer-readable storage device storing instructions which, when executed by the computer processor, cause the system to:
build a classifier to identify images belonging to a predetermined category and output a value indicative of a likelihood that the images belong to the predetermined category, wherein to build the classifier includes to:
retrieve the positive training images and the negative training images from the database;
detect a first object in at least some of the positive training images and a second object in at least some of the negative training images; and
train the classifier to determine the first object as belonging to the predetermined category and the second object as not belonging to the predetermined category.

13. The system of claim 12, wherein the instructions further cause the system to:
receive a particular image to process with the classifier;
output a value indicative of a likelihood that the particular image belongs to the predetermined category;
determine whether the particular image belongs to the predetermined category based on the value; and assign a tag to the particular image, the tag indicating whether the particular image was determined to belong to the predetermined category.

14. The system of claim 13, further comprising a user interface coupled to the computer processor to:
    present the particular image with the assigned tag; and
    receive a selection indicating whether the tag was accurately assigned.

15. The system of claim 13, wherein the particular image is associated with media content.

16. The system of claim 13, wherein the particular image with the assigned tag is used to further train the classifier.

17. The system of claim 13, wherein the tag further indicates whether an object is detected in the particular image.

18. They system of claim 13, wherein the tag is verified with information associated with the particular image.

19. A non-transitory computer-readable memory storing instructions which, when executed by a computer processor, causes the computer processor to:
    build a classifier to identify images belonging to a predetermined category wherein to build the classifier includes to:
        receive positive training images and negative training images;
        detect a first object in at least some of the positive training images and a second object in at least some of the negative training images; and
        train the classifier to determine the first object as belonging to the predetermined category and the second object as not belonging to the predetermined category;
    wherein, the classifier is trained to output a value indicative of a likelihood that an image belongs to the predetermined category.

20. The non-transitory computer-readable memory of claim 19, wherein the instructions further cause the computer processor to:
    receive a particular image to process with the classifier;
    output a value indicative of a likelihood that the particular image belongs to the predetermined category;
    determine whether the particular image belongs to the predetermined category based on the value; and
    assign a tag to the particular image, the tag indicating whether the particular image was determined to belong to the predetermined category.

* * * * *